Nov. 16, 1965  R. A. BARBEAU  3,218,608
RECORD TRANSMISSION SYSTEM
Filed Dec. 14, 1959  18 Sheets-Sheet 15

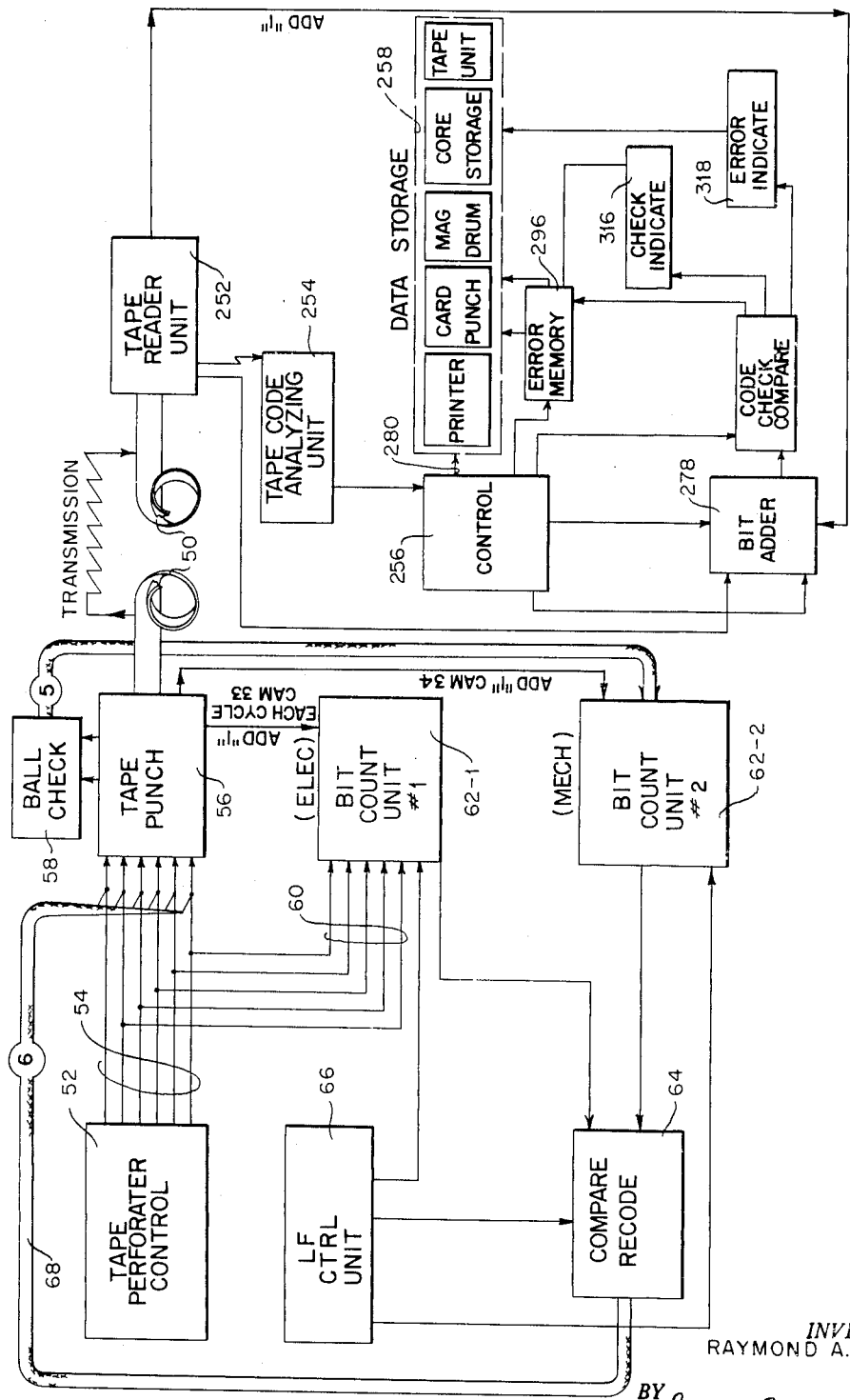

United States Patent Office 3,218,608
Patented Nov. 16, 1965

3,218,608
RECORD TRANSMISSION SYSTEM
Raymond A. Barbeau, Poughkeepsie, N.Y., assignor to International Business Machines Corporation, New York, N.Y., a corporation of New York
Filed Dec. 14, 1959, Ser. No. 859,441
8 Claims. (Cl. 340—146.1)

This invention relates to improvements in record transmission systems and more particularly to a telegraphic tape handling system wherein the accuracy of the data recording on a tape can be checked for accuracy.

Communication systems which transmit data to different points and utilize a tape both in transmission and in conversion are quite useful in the data processing arts, for example, in central account machines for the preparation of payrolls, billing or the like. The accuracy of data transmitted is essential to the effective operation of such a system. In the past much effort has been directed to checking and improving the accuracy of data transmission systems, including transmission systems in which data is transferred from a record for transmission and reconverted to place the information back on a record after transmission.

One type of prior checking system for a telegraphic tape handling apparatus is disclosed in the application of Barbeau et al. Serial No. 553,001, filed December 14, 1955, now Patent No. 2,958,727, for Checking Systems for Record Data Transmission. This prior art system accurately checks the tape as it is prepared for transmission and after transmission for conversion, e.g., the tape checkable tape system checks the accuracy of tape preparation column by column and message by message. The units order of the total number of like data bits in any one message is entered into the tape as a check code at the end of the message and this is compared or checked after preparation and after transmission to determine whether or not the units order of the number of like data bits in the message prepared is the same as the units order of the number of like data bits transmitted or received.

Although such a system as described in the aforementioned application will catch most of the errors in data transmission there is still a possibility where such a system might fail to catch some possible errors. Because the accuracy of any data transmission system is absolutely essential to its reliable operation it is the primary object of this invention to provide a checkable telegraphic tape handling system which will indicate an error if there is misfeeding of the tape, mutilation of signals or dropping or adding of ten or a multiple of ten like data bits of information while adding or dropping tape columns.

During the initial preparation of record data tape such as paper tape in a serial sequence by cycles, if misfeeding of the tape should occur it is possible to record two cycles of information in one tape column. Due to the code structure, for example, with paper tape using a five-bit code, it is possible to punch the second and third channels to indicate one letter in one column and to punch the first, fourth and fifth channels which should be in the next column in the same column as the two and three positions were punched, thus giving a total of five like data bits in one column wherein there should be five like data bits in two adjacent columns. The counting mechanism, if it merely counts the number like data bits punched, would count only the number of like data bits, e.g., five, to be included in the check code and the error would not be detected. During record conversion the misfeed would not be detected and the error in the message would not be detected.

An error of the nature described above could not only occur in the tape preparation for transmission but also in the transmission from one station to another and in the tape repreparation at a receiving station. The insertion of a check digit at the end of the message will not provide the necessary error checking function if there is a column mis-feed and the total like data bits remain the same, such as in the prior art system described above.

Other possible errors are known as compensating errors within a message. In other words, one message may be scrambled during transmission over communication lines such that a plurality of like data bits may be dropped and an equal number of like data bits may be added, thus the total number of like data bits in one message will be the same as the number of like data bits which should have been transmitted. However, if a column is dropped during the transmission or at any other time, the mechanism of this invention will detect that the message is in error even if there is a compensating error in the number of like data bits transmitted.

It is also conceivable that during transmission or tape preparation or re-perforation a number of tape columns could be dropped or lost. If this number of tape columns contained like data bits which are a multiple of 10, the check digit of the number of like data bits in the tape would be the same as the check digit of the number of like data bits which should have been transmitted; therefore, with the prior art apparatus no error can be detected. However, by counting the number of machine cycles, i.e., the number of cycles the punch or tape reader goes through and adding them to the number of like data bits in all the columns of a message, an error of this type will be detected.

Another possibility for introducing an error in a telegraphic tape transmitting system is in the case of a transmitter failing to escape and possible punching all five channel positions an even number of times. If this happens, the total number of like data bits would be a multiple of 10 which would produce a check digit having the same units order as the correct number of digits which should have been transmitted. However, if the number of columns or punching cycles are added, and this is used as the digit, an error of this type will not go undetected.

It is an object of this invention to provide the necessary apparatus and controls for detecting errors such as those described above caused by such malfunction of the machinery and for preventing the processing of information if such errors exist. The detection of such errors can be readily accomplished by a relatively simple apparatus disclosed in this application.

It is another object of this invention to provide a check on the number of tape columns contained in a record message. This control is put in at the time of tape preparation and checks the complete system from tape reading to conversion. Regardless of the means of tape preparation, tape transmission and re-preparation, as well as tape reading for conversion, column check for record control is in effect.

Other objects of the invention will be pointed out in the following description and claims and illustrated in the accompanying drawings which disclose, by way of example, the principle of this invention and the best mode which has been contemplated, of applying that principle.

In the drawings:

FIG. 1 is schematic showing of the improved tape processing and error checking system of this invention;

FIG. 2a is an illustration of a punched paper tape for transmitting the message "IBM" and shows how the prior art apparatus checks the total number of like data bits in a message and introduces the units order of this total as a check code at the end of the message;

FIG. 2b illustrates one type of error which can be caused by mis-feeding of the paper tape in either tape preparation or in reproduction or in transmission, wherein a column is dropped, and shows how the prior art apparatus, by counting the total number of like data bits in a message, will fail to detect this error;

FIG. 3a illustrates a paper tape prepared for transmitting the message "IBM" and shows the count for the number of like data bits plus the number of column cycles the machine attempts to go through and the entering of a check digit in the check position in accordance with the teachings of this invention;

FIG. 3b shows how the apparatus of this invention will catch an error of the type shown in 2b caused by mis-feeding of a tape column;

Figure 4:
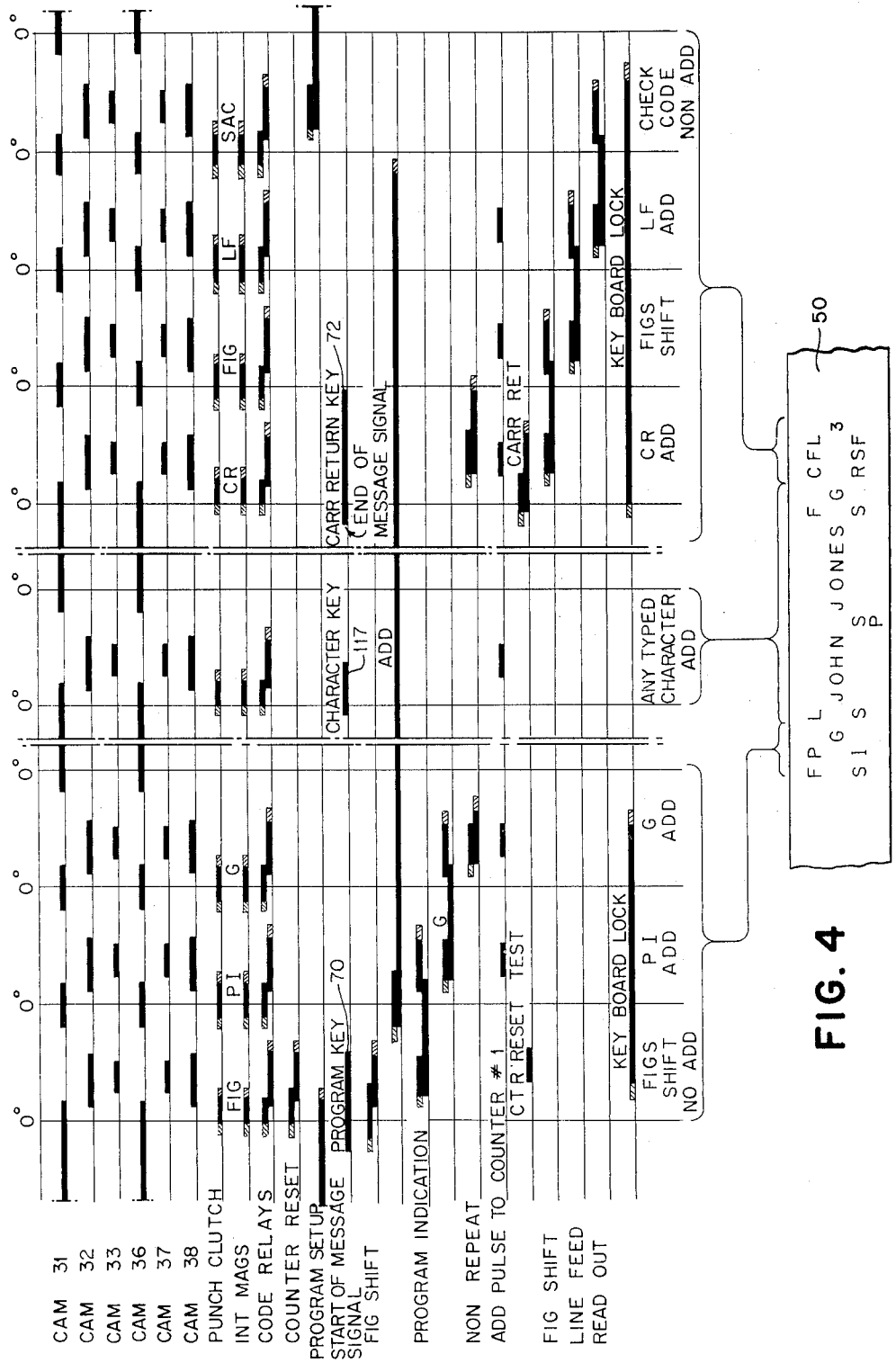
FIG. 4 is a sequence chart or timing diagram.

Briefly, this invention is an improvement on that described in copending application Serial No. 553,001, the improvement providing a checkable tape record length control whereby a discrepancy in the number of like data bits and the number of columns in a message can be detected to prevent the processing of data in a message which is an error. Such errors might occur during mis-feeding during tape preparation, transmission, or reperforation, and/or occur by column and like data bit addition or dropping during transmission over leased wires or other media. More specifically, the apparatus of this invention contemplates adding to the number of like data bits in each column or cycle of the machine a numeric 1 and obtaining a total to be entered as a check digit which total will represent the number of like data bits and the number of column cycles of the machine. Therefore, if there is any discrepancy between the total number of like data bits and number of columns in the record and the number of data bits and columns which should be in the record the error will be detected.

Figures 2A, 2B, 3A, 3B:
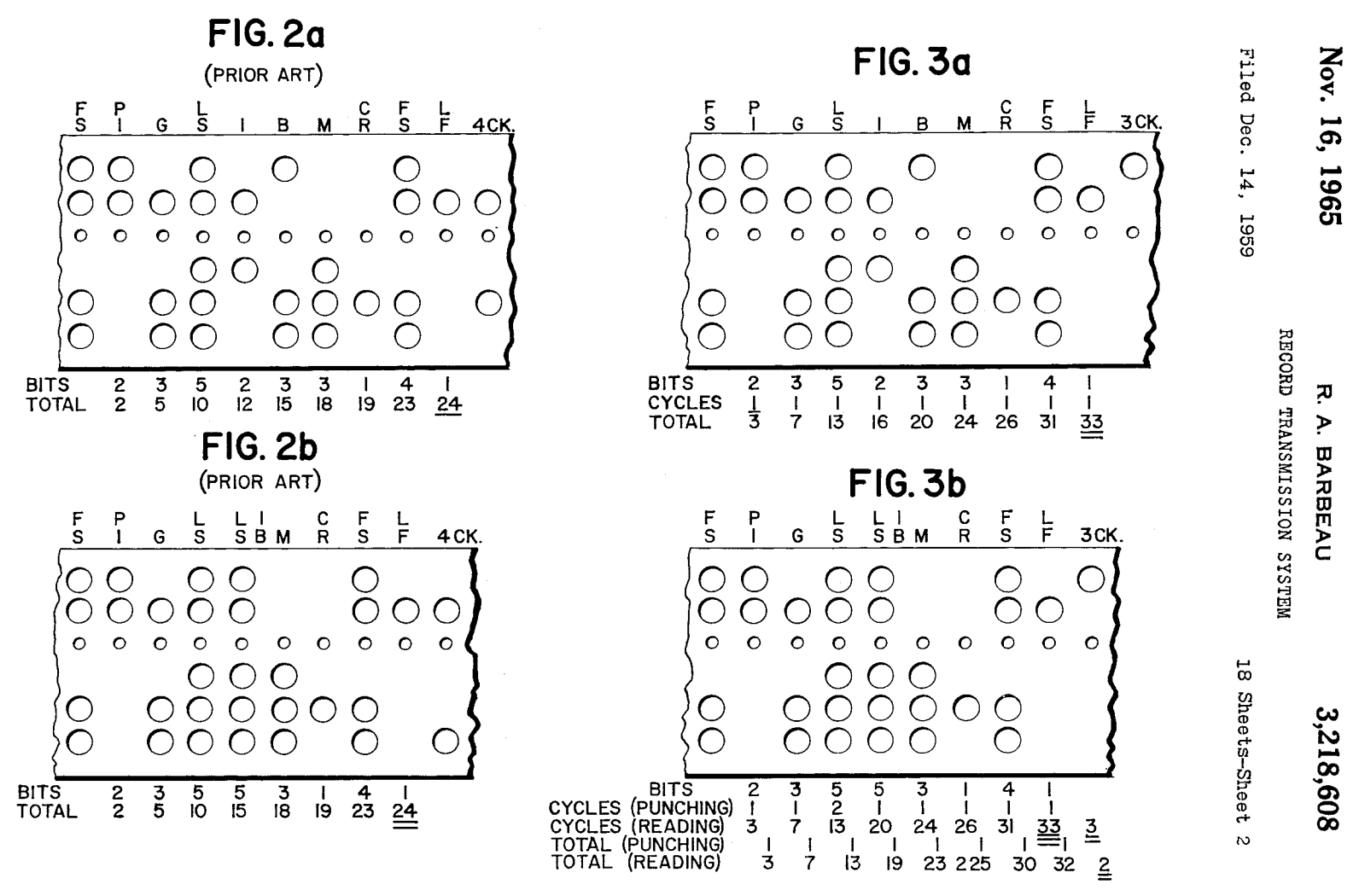

The essence of this invention and its relationship to the prior art in function can be explained with reference to FIGS. 2a, 2b, 3a, and 3b. FIG. 2a shows a paper tape wherein the message "IBM" is to be transmitted, processed after transmission and $$\begin{matrix} F & P & & L & & C & F & L \\ S & I & G & S & IBM & R & S & F \end{matrix} 4$$

has been punched. It can be seen that the total number of like data bits, after the first

F
S (figures shift) has been entered, is counted and for this particular message the total number of like data bits is 24. Therefore, by an apparatus similar to that described in the aforementioned application the check digit 4 is entered into the check position after the

L
F

Referring to FIG. 2b, there is shown a paper tape wherein the same message was attempted to be entered into the tape either during preparation for transmission or during reperforation (however, the same error could occur during transmission) and one column has been dropped. In other words, the fifth and sixth columns have been superposed and the I code punching in channels 2 and 3 has superimposed upon it the code for B representing by punching and in channels 1, 4, and 5. The combined punching of all five channels in one column position is the code for letter shift

L
S

In counting the like data bits of each column cycle of the message the total number of such bits is the same as the correct tape of FIG. 2a, namely 24, and the units order digit, 4, is entered as a check code onto the record. Thus, the check code 4 of the tape will be the same as the check code for the tape which should have been prepared and the error, caused by mis-feeding or the like, will not be detected.

FIG. 3a shows the same message as punched in the tape of 2a. However, the number of cycles the machine goes through in punching is added to the total number of like data bits as shown in FIG. 3a with the resulting total of 33, therefore the units order digit, 3, is entered in the check code column position.

FIG. 3b shows what will happen if there is an error similar to that shown in FIG. 2b, i.e., a mis-feeding or other error causing superposition of columns 5 and 6 and punching all channel positions producing the same number of total like data bits and a different number of columns. During original tape preparation, by adding the punching cycles to the total number of like data bits the resulting total is 33 and the check digit 3 is entered into the check position. Since the check digit 3 of the tape read for further processing will not compare with the check digit 2 generated during the tape reading for processing, the error will be detected by comparison means and the incorrect message or data will not be processed. In other words, during tape reading, by adding numeric 1 for each reading cycle or tape column, the column mis-feed is readily detected as shown by comparison of the reading and punching like data bit plus cycle totals in FIG. 3b.

FIGS. 2b and 3b illustrate only one type of error, and that is where two column punchings are placed in the same column to give an incorrect message. However, numerous other types of errors can occur in data transmission systems resulting in a number of like data bits which is equal to a multiple of 10 above or below the correct number of like data bits which should be in the message. Unless the number of columns or machine cycles are added to the number of like data bits, errors such as these may go undetected. Such errors could occur where a number of complete columns containing like data bits which are equal to 10 or a multiple of 10 are either added or dropped in transmission of the message over leased wires or other communication media. Other errors caused by the addition and dropping of the same number of like data bits coupled with an incorrect transmission of the number of columns would also be detected by the detecting technique described above.

The apparatus of the detecting system is shown schematically in FIG. 1. This apparatus is generally similar to that shown in the aforesaid copending application with the exception that it has been modified to add numeric 1 to the electrical bit count unit #1, 62–1, and the mechanical bit count unit #2, 62–2 every time tape punch 56 goes through or attempts to go through a punching cycle. On the tape conversion end of the system after transmission the tape reader unit 252 has been modified to add numeric 1 to the bit adder 278 every time the tapereader unit goes through a reading cycle. The addition of numerical one is under control of the tape punch 56 rather than tape perforator control 52 in the tape preparation and in the tape conversion is under the control of tape reader mechanism 252, and is controlled by the timing cams therein as will be explained in detail hereinafter.

With reference to the remaining drawings, and in order to explain the operation of this apparatus invention, a length of telegraphic tape 50 is shown in FIG. 4 as having a data entered into it in accordance with data typed on a printed form or other source document. While the codes are actually perforated holes, as shown in FIGS. 2 and 3, in FIG. 4 the character itself is shown for clarity.

As set out in aforesaid application Serial No. 553,001 (IBM Docket 5075), the beginning of a message must be positively identified. In the illustrated embodiment, the beginning of the message is indicated as

F
S (Figures Shift telegraphic code). Actually, the first

F
S code after a

L
F (Line Feed telegraphic code) identifies the beginning of a message, except at the beginning of an operation wherein the first

F
S code identifies the beginning of a message.

As further shown on tape 50, it is also necessary to positively identify the end of a message which in FIG. 4 is identified as

L
F following a

C
R (Carriage Return telegraphic code). Actually, once the message has been started, then any time after a

C
R code, irrespective of the number of intervening characters the

L
F code will identify the end of message. In the cycle following the end of message signal, a check code is entered into the tape which represents the units order of the total number of like data bits in the message plus the number of column or punching cycles of the tape punch.

If no hard copy is required, however, in a specific system, then the

C
R code would not be necessary, and the end of message would be identified by the first

L
F code following the start of a message, see FIGS. 2 and 3 for example.

While it is not intended to be a limit on the scope of this invention, but in order to show an example of operation, a document is prepared by a key operated mechanism which concurrently reproduced in the tape 50. As "John Jones" is printed on the document, then the concurrently

L
S

"John Jones" is entered into the tape. Following "John Jones,"

F G
S is entered into the tape merely as a control code for certain types of tape conversion equipment, and is not a necessary element. The

C F L 3
R S F codes are then entered automatically as the machine operator returns the carriage of the machine printing the document, provided all checks have been satisfied.

With reference to FIG. 1, a tape perforator control unit 52 may be a part of a tape preparation unit. Perforator control unit 52 may be either a calculator unit, a card to tape unit, or in a specific embodiment, a key operated mechanism, such as a Typewriter Tape Punch shown in copending U.S. Patent application Serial No. 556,629.

Any one of these units can provide pulses to enter information into a telegraphic tape in five unit code. The tape perforator control unit 52 is shown cable connected by a cable 54 to a tape punch 56. The cable 54 is indicated as having six lines, of which only five are used for the actual message that is being entered into the tape. The sixth line is used in one form to determine whether or not an odd number of electrical impulses have been emitted by the tape perforator control 52. The mechanism for showing whether or not this check is satisfied is described completely in copending U.S. Patent application Serial No. 556,643.

As the electrical pulses are transmitted along cable 54, the tape punch 56 is operated. That is, interposer magnets (as shown in U.S. Patent 2,540,027) control the operation of actual punch pins in tape punch cycles. As the tape pins perforate the tape, a ball check unit 58 is operated as described completely in copending U.S. Patent application 556,643 which indicates positively, by closing contacts, that pins have perforated the tape. Concurrently, with the pulsing of tape punch 56 for punching some combination of five telegraphic bit spaces, electrical pulses are sent to a bit counter identified as 62–1. Also, during a predetermined time in the punch cycle and under control of the tape punch 56 a numeric 1 is also added to electrical bit counter 62–1.

As the actual information is punched into the tape, the ball check unit 58 controls the operation of a second bit counter 62–2. A numeric 1 is also added to the mechanical bit counter 62–2 under control of the tape punch 56 during each punch cycle. At every tape column, the two counters are compared to see if they agree, and then at the end of every message, the two counters are tested for comparison, and if they do compare, then a code representing the units order of the total number of bits in the counters is sent through a six-line cable 68 back to the tape punch 56 wherein the telegraphic code for the units bit is entered into the tape. (Hereinafter, the code representing the units order of the number of like data bits plus the number of punch cycles in a message will be called check code.) If any of these checks are not satisfied, the machine will be stopped.

Reference is also made to FIG. 4, which shows a sequence or timing chart for the preparation of the tape 50. The sequence chart is divided into three portions, beginning of message, the message, and end of message. Portions of the sequence chart are schematically indicated as being connected to parts of the tape 50 representing the beginning of the message, the actual message, and the end of message.

With reference to the beginning of message, and since the mechanism is illustrated as being under control of a typewriter tape punch, of the type shown in copending U.S. Patent application Serial No. 556,629, it is necessary to depress a program key at the beginning of each line or message. In a manner identical to that described in U.S. Patent application Serial No. 553,001, the depression of a program key causes

F P G
S I codes to be entered into the tape automatically as described below:

Wiring diagram

The wiring diagram for tape preparation and error checking is shown in FIG. 5 and the timing chart therefor is shown in FIG. 4. A complete cycle of operation will be described. First of all, with respect to FIG. 5g, and with the understanding that the described circuits are between "+" and "—" lines, a Carriage Return key contact 72 is operated to send a pulse through the add relay point 110–4, normally closed to energize the program setup relay 76. The program setup relay has a hold circuit through its own point 76–1, now closed and through the program indication relay point 78–1. Then when a program key contact 70 is operated, it will send a pulse through program setup relay contact 76–2 to energize the Fig. Shift relay 80. The Fig. Shift relay 80 has a hold circuit, FIG. 5f, through its own contact point 80–2, now closed, through contact point 80–3, now closed, FIG. 5e, through cam 31 which is closed at the beginning of a cycle. The Fig. Shift relay 80 has a second hold circuit, FIG. 5f, through the rectifier 82 and through the contact 80–1 normally open, now closed, and through cam 32 which is closed at a later portion of the cycle. With this circuitry, Fig. Shift relay 80 has a hold circuit through both cam 31 and cam 32.

Figure 5A:
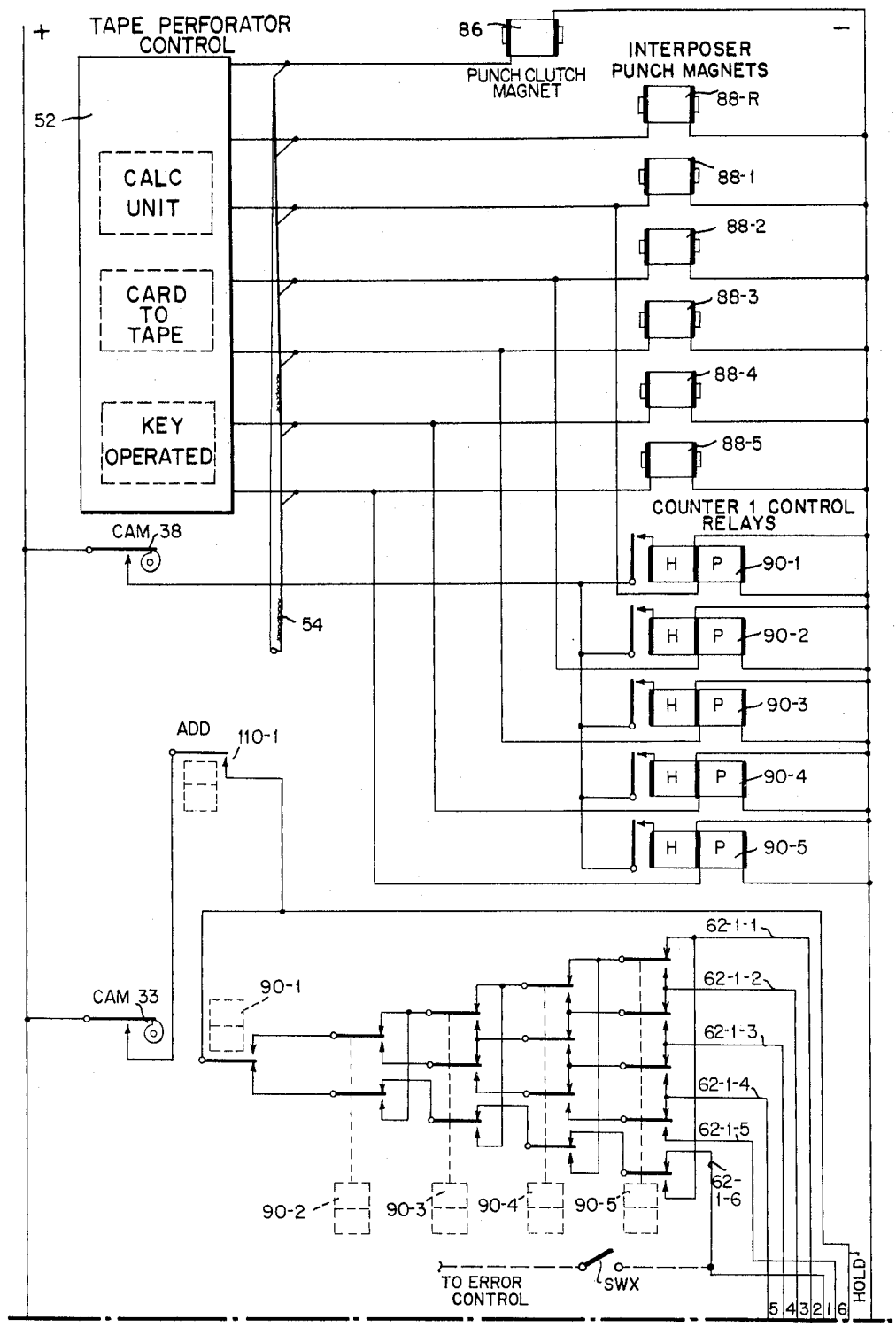
FIG. 5a through 5i is a wiring diagram of the tape preparation equipment.
Figure 5B:
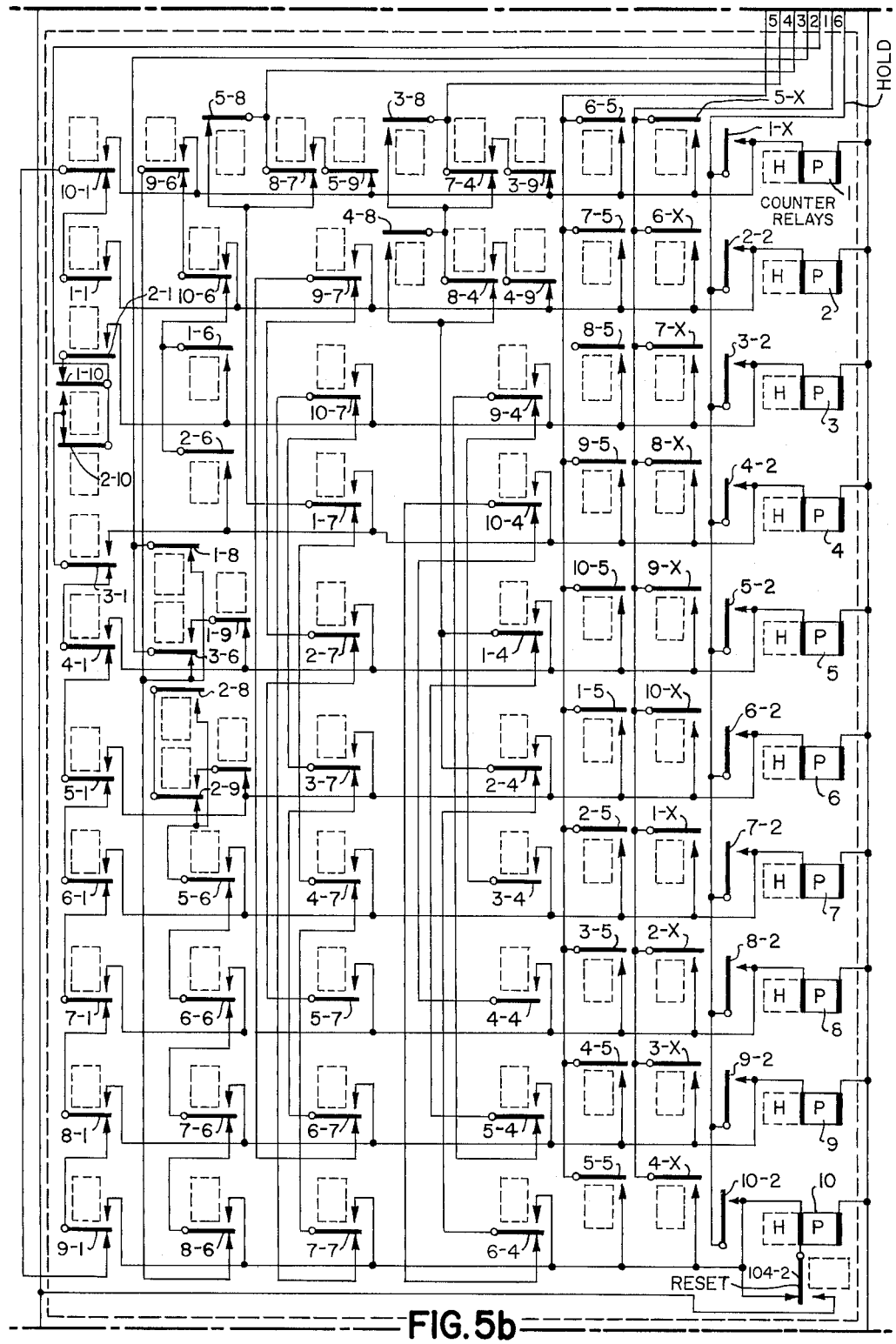
Figure 5C:
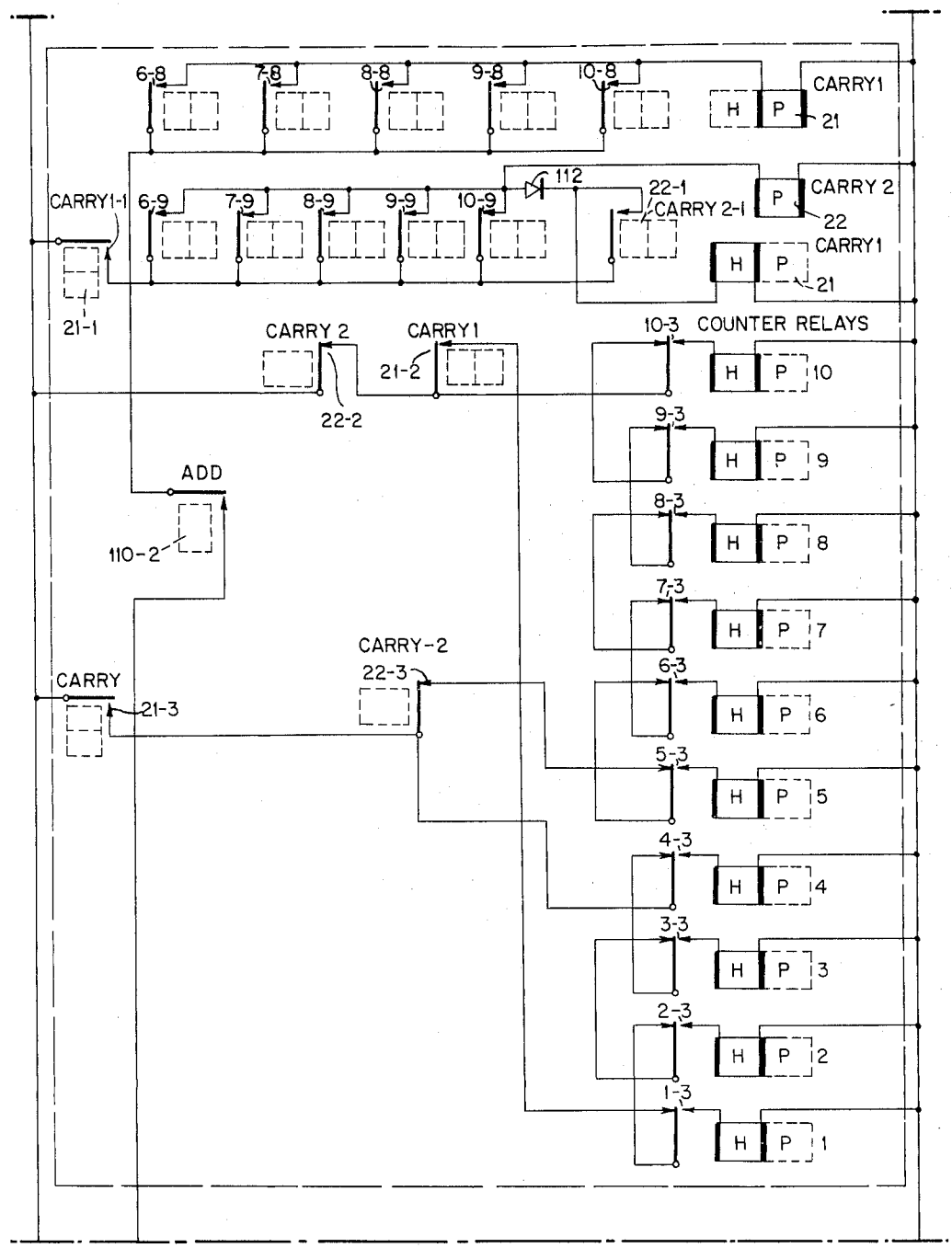
Figure 5D:
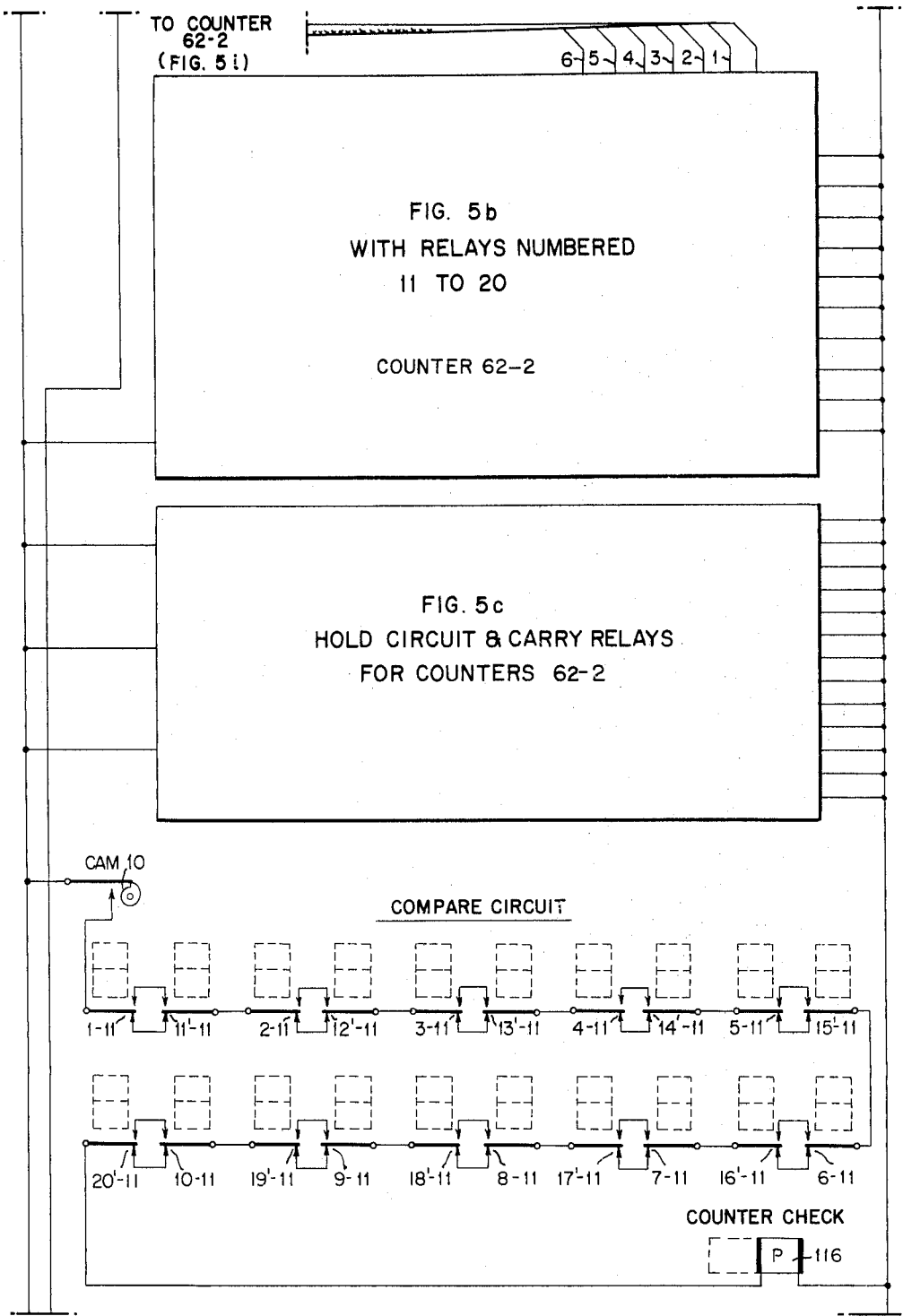
Figure 5E:
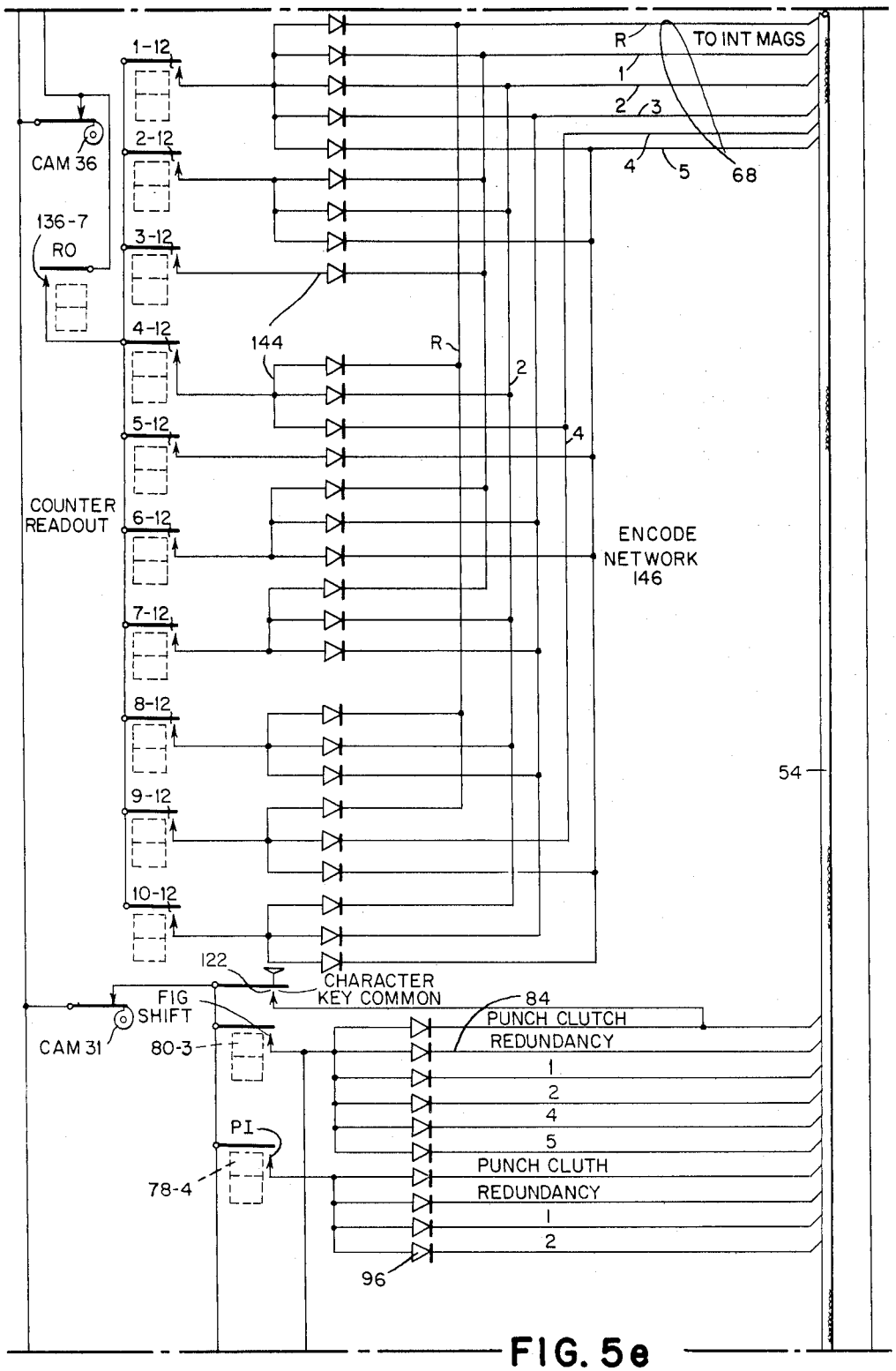

With reference to FIG. 5e, at the beginning of the cycle while cam 31 is closed with point 80–3 now closed, a pulse is available through the rectifiers 84 to cable 54. (While cable 54 is shown in FIG. 1, as having only six lines, it will be understood that it carries also a punch clutch line which serves the purpose of energizing a punch clutch to initiate every punch cycle.) The pulse from cam 31 and through contact point 80–3 energizes the punch clutch line, the redundancy check line, and lines 1, 2, 4, and 5, in cable 54, and then with reference to FIG. 5a, it can be seen that these lines will carry pulses to energize the punch clutch magnet 86, and the interposer magnets 88–R, 88–1, 88–2, 88–4, and 88–5, which causes the tape to be perforated with Figs. Shift code

"F"
S i.e., punchings in channels 1, 2, 4, and 5.

It can be recognized from FIG. 5a, that every time a pulse is sent to an interposer magnet, an electrical pulse is concurrently available to energize the pick coils of the corresponding counter control relay 90. Accordingly, during the first tape cycle, counter control relays 90–1, 90–2, 90–4, 90–5 will be energized. The counter control relays 90 are a part of counter 62–1, as later described. Each of the counter control relays 90 has a hold circuit through its own contact point and through cam 38.

Figure 5F:
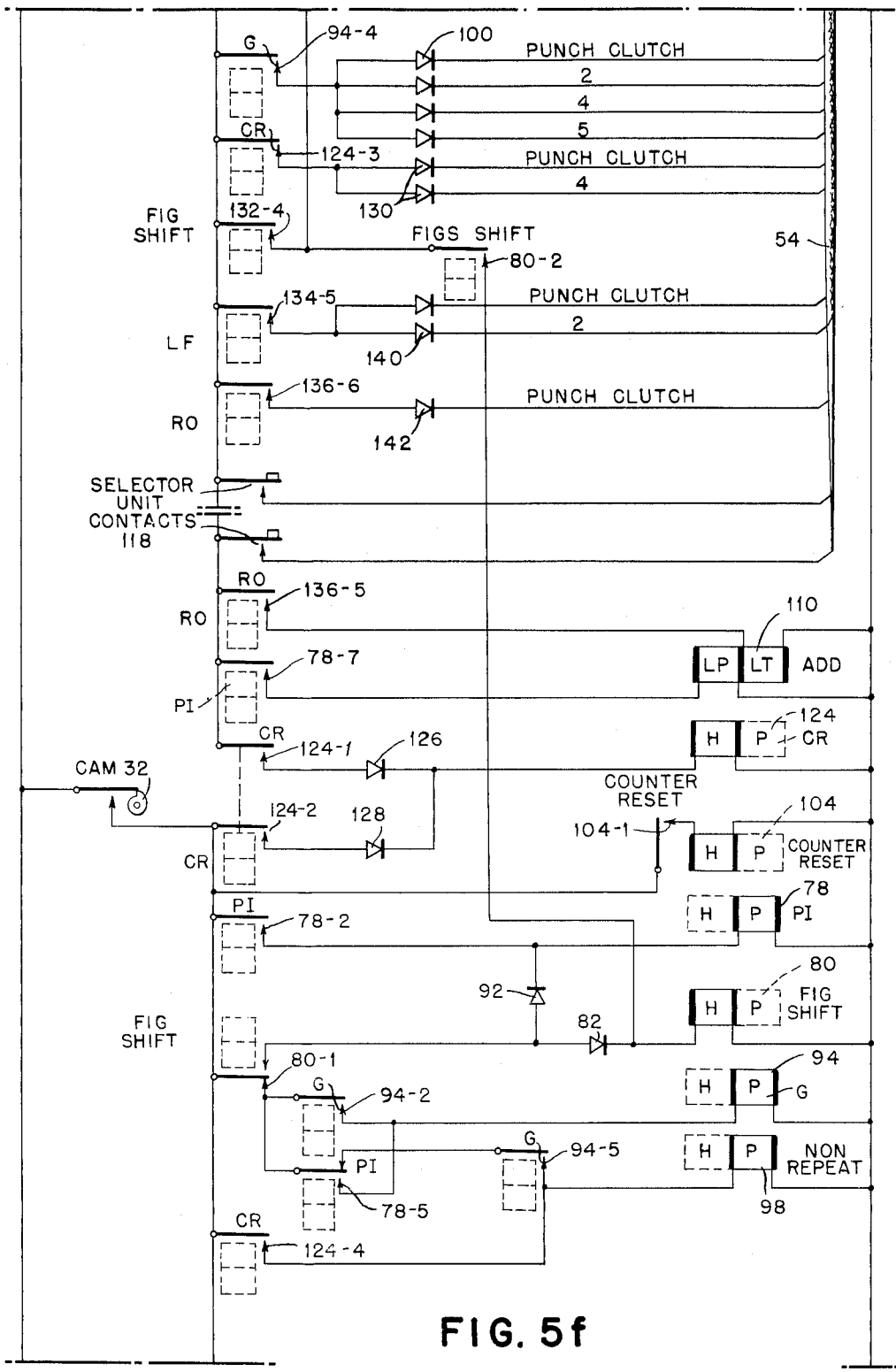

During the first punch cycle at cam 32 time, FIG. 5f, a pulse is available through contact 80–1 normally open, now closed, through the rectifier 92 to energize the pick coil of the Program Indication relay 78. Program Indication relay 78 has a hold circuit through its own pick coil, through 78–2 contact point normally open, now closed, and through cam 32 time. A further hold circuit is provided for relay 78 through contact point 78–3 shown in FIG. 5g, normally open, now closed, and through the normally closed G relay point 94–1. Therefore Program Indication relay 78 will not drop out until G relay 94 picks up provided cam 32 is not closed.

At the completion of the first punch cycle, when cam 31 is again closed, FIG. 5e, with Program Indication relay 78 energized, the point 78–4 will be closed, and accordingly, a pulse will be available through point 78–4 through the rectifiers 96 to energize the punch clutch line, the redundancy line, and lines 1 and 2 of cable 54 whereupon with reference to FIG. 5a, the punch clutch magnet 86 will be energized along with the interposer magnets 88–R, 88–1 and 88–2. This will cause another punch cycle wherein the

"P"
I code will be entered into the tape, i.e., channels 1 and 2 will be punched. The foregoing is only one example of the operation of the tape machine and it should be understood that if any other program has been selected, as shown in copending U.S. Patent application Serial No. 556,629, that a different combination of interposer magnets would have been energized along with punch magnet 86 during the second punch cycle.

During the second punch cycle, and with reference to FIG. 5f at cam 32 time, a pulse is available through the normally closed 80–1 contact point and through the normally open, now closed, point 78–5 to energize the G relay 94. The G relay has two hold circuits, one through its own pick coil, through contact 94–2 now closed, through the contact 80–1 normally closed, and through cam 32; while with reference to FIG. 5g, its hold coil is energized through its own contact point 94–3 now closed, and through a Non-Repeat contact point 98–1. Therefore, the G relay 94 will drop out when the Non-Repeat coil 98 is energized, provided cam 32 is not closed.

At the completion of the second cycle, during which

"P"
I code was entered into the tape, when cam 31 makes again, a pulse will be available, FIG. 5e, through the point 94–4 now closed, FIG. 5f, and through the rectifiers 100 to the punch clutch line and the interposers 2, 4, and 5 lines of cable 54. Therefore, with reference to FIG. 5a, a third cycle is initiated by energizing the punch clutch 86 along with the interposer magnets 88–2, 88–4, and 88–5, whereupon a "G" code is punched in the tape.

With reference to the sequence chart, it can be recognized that after the third cycle when the "G" is entered into the tape, the automatic operation of the machine is terminated. This is shown on the wiring diagram as follows: during the third cycle at cam 32 time, a pulse is available through the normally closed point 80–1, FIG. 5f, through the normally closed point 78–5 and through point 94–5 now closed, to the pick coil of the Non-Repeat relay 98. The Non-Repeat relay 98 has a hold circuit, FIG. 5g, through its own point 98–2 now closed, and through the normally open, now closed point of the "G" relay 94–1. Therefore, it can be seen that when the "G" relay drops out, the hold circuit of the Non-Repeat relay will be broken, and as described above "G" relay will drop out at the end of the cam 32 time.

Since this part of the cycle is automatic, it is apparent that some provision should be made during automatic time for preventing the operation of the tape perforator control 52. This may be accomplished by locking the keyboard of a Typewriter Tape Punch. The keyboard is locked by the Keyboard Lock solenoid 102 FIG. 5h, which is energized through either the 78–6 or 94–6 contact points. The automatic cycle of operation is identical to that described in aforementioned application Serial No. 553,001.

Counter control

It was mentioned that the theory of operation of this invention is based upon the use of counters. (The counters are of a relay type which will be later described.) It is obvious, however, that at the beginning of every message, the counters should be reset to zero, and checked to see that they have been reset. This is also accomplished as in aforementioned application Serial No. 553,001. To accomplish this objective a pulse is available, prior to the first automatic cycle, and referring to FIG. 5g, after the figure. Shift relay 80 has been energized, through the contact point 80–4 now closed, to energize Counter Reset relay 104. The Counter Reset relay 104 has a hold circuit, FIG. 5f, through its own point 104–1 now closed, and through cam 32. The energization of the Counter Reset relay 104 provides a circuit, FIG. 5b, through the 104–2 point normally open, now closed to energize the Counter Relay 10. The Counter Relay 10, which represents a zero in the counter, has a hold circuit, FIG. 5c, through its own 10–3 contact point normally open, now closed through the normally closed point 22–2 of the Carry Relay 22.

Incidentally, each of the Counter Relays is indicated as having hold coils, FIG. 5e, with all the hold coils being energized through the 10–3 normally closed contact point. Accordingly, when the Reset Relay 104 is energized, to pick up the Counter Relay 10, it will open the 10–3 normally closed contact point thereby dropping out any of the Counter Relays 1 through 9.

During the first cycle, a test is made to make sure that the counters have been reset to zero. That is, at cam 37 time, FIG. 5h, a pulse is available through the counter reset point 104–3 now closed, to test whether or not counter 10 is energized and counters 1 through 9 are not energized. If this test is not satisfied, then a pulse is available to the Error Control relay 106, FIG. 5i. The Error Control relay 106 has a contact point 106–1, FIG. 5h, which, when closed, will energize the Keyboard Lock Solenoid 102. The Error Control relay 106 has a hold circuit, FIG. 5i, through its own contact point 106–2, and through some manually controlled contact, such as the Error Reset Key 108.

Towards the end of the first automatic cycle when cam 31 makes again, FIG. 5e, a pulse is available through the Program Indication relay point 78–7, FIG. 5f, now closed, to the latch pick coil of the Add Relay 110. This is a latch controlled relay, and once energized it will stay latched with the contacts transferred until unlatched by the latch trip coil. The Add Relay contact points must be transferred for the counter to operate. Since the Add Relay 110 was not energized until the end of the first tape cycle, the bits representing the

"F"
S code were not added, but the like data bits and machine cycles of columns or character positions in the complete message will be added.

*Relay counter*

The relay counter is constructed to add numeric 1 to the number of like data bits in each punching cycle. It has been stated above, that every time the interposer magnets 88 are energized, a parallel pulse is provided to the Counter Control Relays 90 of the counter 62–1. The relays 90 have multiple contact points as shown in FIG. 5a, arranged in relay tree network fashion, so that for every combination of the Counter Control Relays 90 that are energized, there will be a circuit available to an individual one of lines 62–1–1 to 62–1–5. If a circuit is not available through this network, then a circuit will be available to the line 62–1–6 for selectively energizing an Error Control Relay 106 in FIG. 5i. At cam 33 time, indicating a punching cycle, a pulse is available through the selected line 62–1–1 through 62–1–5 to the Relay Counter network shown in FIG. 5b. The selected line is connected to the next higher line of the relay counter network for the purpose of adding numeric 1 during each cycle, i.e., line 62–1–1 is connected to the add 2 line, line 62–1–2 is connected to the add 3 line, etc. The 62–1–6 line is connected to the add 1 line and by a manual switch SWX to error control. By this arrangement, with switch SWX open a blank punching cycle will add 1 to the counter, and with switch SWX closed a blank punching cycle will initiate the error control.

In order to explain the operation of the relay tree network of FIG. 5a, a specific example will be given. During the second cycle, with a zero in the counter and Add Relay 110 latched, when the

"P"
I code was entered into the tape, energizing the Interposer Relays 88–1 and 88–2 and Counter Control Relays 90–1 and 90–2, a pulse is available at cam 33 time. The pulse passes through the Add Relay point 110–1, FIG. 5a, through the 90–1 normally open now closed contact point; through the 90–2 normally open now closed contact point; through 90–3 normally closed; through the 90–4 normally closed; through the 90–5 normally closed; through the line 62–1–2; to the 3 line of the counter, FIG. 5b, through the Counter Relay point 8–7 normally closed, and through the following normally closed Counter Relay points: 1–7, 4–7, 7–7, and through the normally open, now closed point 10–7 to energize Counter Relay 3. The relay point 10–7 was transferred as there was a zero in the counter, i.e., Counter Relay 10 was energized.

As stated above, each of the Counter Relays has a hold circuit, and Counter Relay 3 has a hold circuit, FIG. 5c, through its own point 3–3; through 4–3; through 5–3; through the normally open, now closed point of Carry Relay 21–3. (The carry relay 21 was energized at the end of the first cycle when cam 36 made, FIG. 5e, sending a pulse through the now closed point 110–2, FIG. 5c, through 10–8 now closed to the Carry Relay 21. When Carry Relay 21 is energized, a hold circuit is established through the point 21–1 now closed; through the point 10–9 now closed; through the rectifier 112 to the hold coil of the Carry Relay 21. A parallel circuit is also available through contact 10–9 now closed to the Carry Relay 22. When Carry Relay 22 is energized, the point 22–1 is closed providing a hold circuit through the Carry Relay point 21–1 now closed; through the Carry Relay point 22–1 now closed, to hold the Carry Relay 21.) When the Carry Relays 21 and 22 are energized, a hold circuit is available for the Counter Relay 10; through the point 10–3 now closed; through the 21–2 point now closed; through the following normally closed Counter Relay points: 1–3; 2–3; 3–3; and 4–3; then through 21–3 now closed. Therefore, when the Counter Relay 3 is energized, point 3–3 will be transferred to interrupt the circuit to the hold coil of Counter Relay 10. Counter Relay 10 will not drop out, however, since a circuit is still available through its pick coil. The pick coil circuit is through the 10–2 now closed contact point, FIG. 5b, through the 110–1 Add point, FIG. 5a, now closed; through cam 33. At the end of cam 33 time, a pulse is no longer available to the pick coil of the Counter Relay 10 and therefore, it will drop out. This then will leave the hold coil of the Counter Relay 3 energized, signifying the two bits plus 1 cycle have been added in counter 62–1.

When Counter Relay 10 dropped out, FIG. 5c, the 10–9 contact point opened, thereby interrupting the circuit for the Carry Relay 22, which in turn opens the point 22–1 to de-energize the hold coil of the Carry Relay 21.

With further reference to FIG. 5c, it will be recognized that when Carry Relay 22 drops out, the point 22–2 will be restored to its normally closed position—prior to the Carry Relay 21 dropping which will open the contact points 21–3. These relays are dropped out in the stated order to maintain a circuit to the hold coil of Counter Relay 3. That is, the hold circuit will be changed as follows through its own contact point 3–3 now closed, and through the following normally closed counter relay points: 4–3; 22–3; 5–3; 6–3; 7–3; 8–3; 9–3; and 10–3; then through 22–2 normally closed.

During the third punch cycle, as above described, the "G" code was punched in the tape thereby energizing the 90–2, 90–4, and 90–5 Counter Control Relays.

Then, at cam 33 time in the punching cycle a pulse is available through add point 110–1, now closed; through contact 90–1 normally closed; through contact 90–2 transferred; through contact 90–3 normal; through contact 90–4 transferred; through contact 90–5 transferred; to line 62–1–3; to the add 4 line, FIG. 5b through the following normally closed Counter Relay points: 7–4; 8–4; 1–4; 5–4; 9–4; through 3–4 transferred, since there is a 3 in the counter to energize Counter Relay 7 (3+4=7). This relay is held through its own 7–3 contact point, FIG. 5c, and through the following normally closed Counter Relay points: 8–3; 9–3; and 10–3; then through Carry Relay point 22–2, normally closed. It will be recognized that when Counter Relay 7 is energized, the contact point 7–3 transfers thereby opening the circuit to the hold coil of the Counter Relay 3. The pick coil of Counter Relay 3 will hold through cam 33 time. Accordingly, at the end of the third tape cycle ("G" code) there will be a 7 standing in the counter. Toward the end of the "G" cycle when cam 36 makes, counter 7–8 point being made will pick carry 1 and carry 2, respectively, and establish a new hold circuit path for Counter Relay 7.

In accordance with the tape 50 shown at the bottom of FIG. 4, the next character keyed is "J," but as required by standard teletype procedure, this code has to be preceded by an

"L"
S code (letters shift). The

"L"
S code is 5 holes or punchings in all 5 channels, and accordingly 6 additional bits will be entered in the counter (5 data bits plus 1 cycle).

For the

"L"
S code, at cam 33 time during the punching cycle a pulse is available through add point 110–1, now closed through 90–1 transferred, 90–2 transferred, 90–3 transferred, 90–4 transferred, and 90–5 transferred to line 62–1–5. Line 62–1–5 is connected to the add 6 line of the counter, FIG. 5b. Thus, the circuit is completed through add 6 line to the relay contact 7–X, transferred as there was a seven in the counter, energizing the pick coil of Counter Relay 3 (7+6=13).

When Counter Relay 3 is energized, a hold circuit, FIG. 5c, is available through its own contact point 3–3, transferred, through the following normally closed contact 4–3, and through Carry Relay contact point 21–3. With the transferring of contact point 3—3, the hold coil of the Counter Relay 7 will be de-energized. However, the pick coil of Counter Relay 7 will not be de-energized until cam 33 opens. At the end of cam 33 time, therefore, the Counter Relay 7 will drop out leaving a 3 in the counter. Also Carry 1 and 2 will be dropped out because Counter Relay 7 dropped.

Towards the end of the

"L"
S code tape cycle, when cam 36 makes, a circuit is available through cam 36; but since none of the contacts 6–8, 7–8, 8–8, 9–8, or 10–8 is transferred, the pick coil of the carry Relay 21 is not energized.

*Ball check unit and counter unit 62–2*

The tape punch is provided with a ball check unit 58, which is described in detail in copending U.S. application Serial No. 556,643. This ball check unit, in response to the actual mechanical penetration of the tape by the punch pins will close electrical contacts. In the instant illustration, the ball check unit 58 is employed to energize, FIG. 5h, the Counter Control and Redundant relays 120–R through 120–5. These relays serve a dual function of providing a check circuit, and a Counter Control circuit, FIG. 5i, hereinafter described.

Figure 5G:
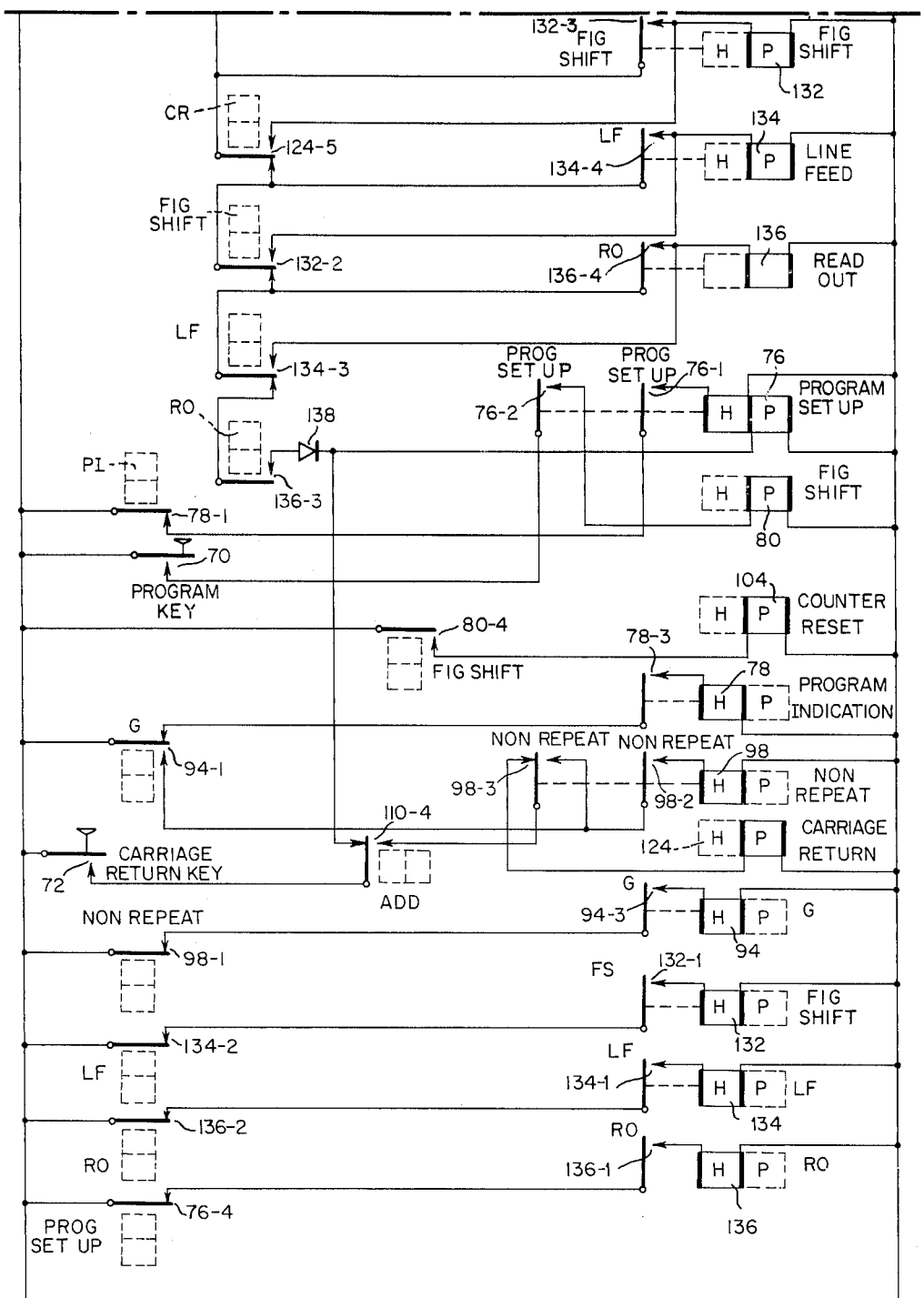
Figure 5H:
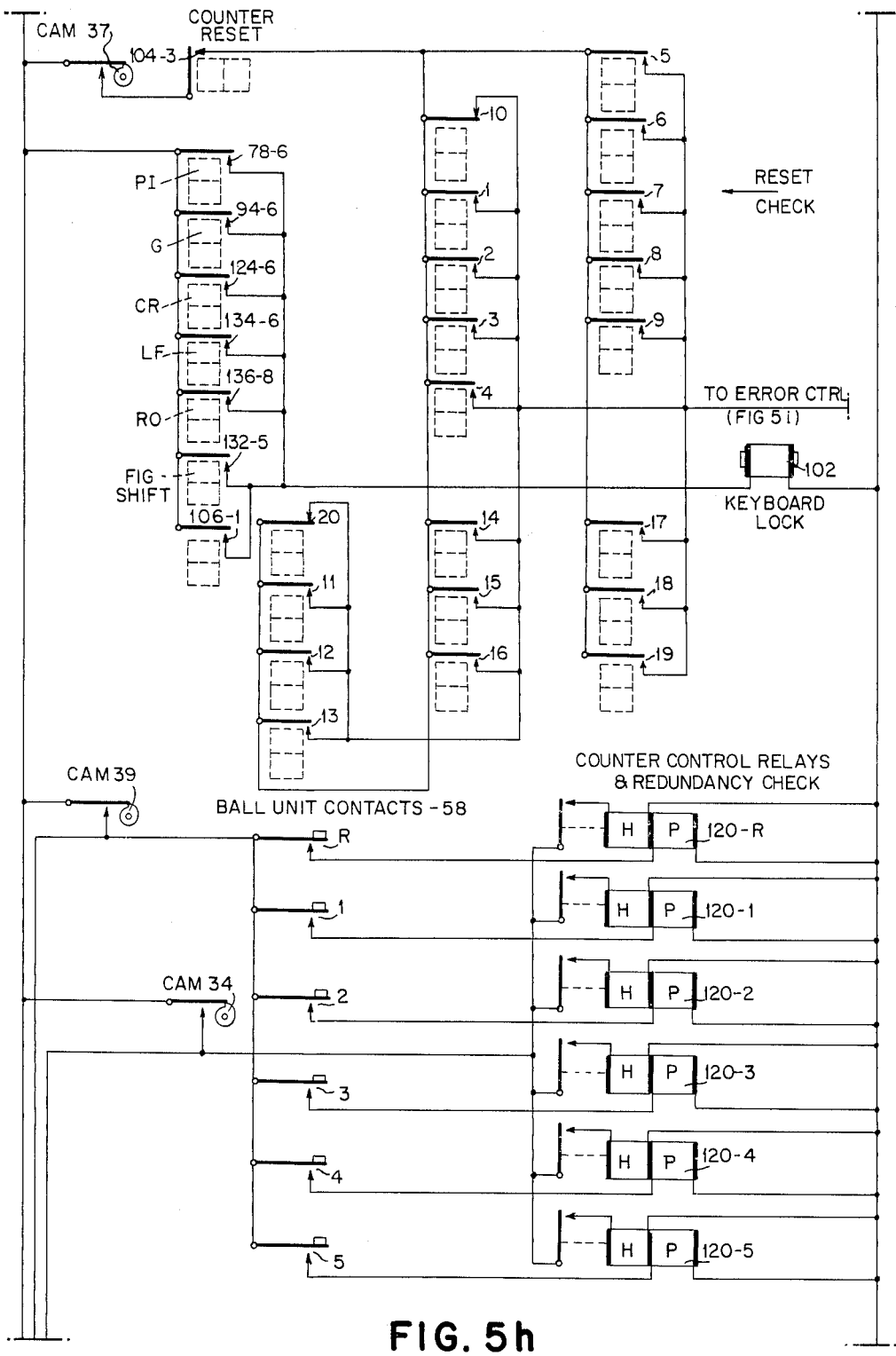

The relays 120–R through 120–5 are selectively energized during each punch cycle, FIG. 5h, at cam 39 time; through the ball unit contacts 58–R through 58–5. A hold circuit is provided for the relays 120 through their own contact points respectively, and through cam 34.

Figure 5I:
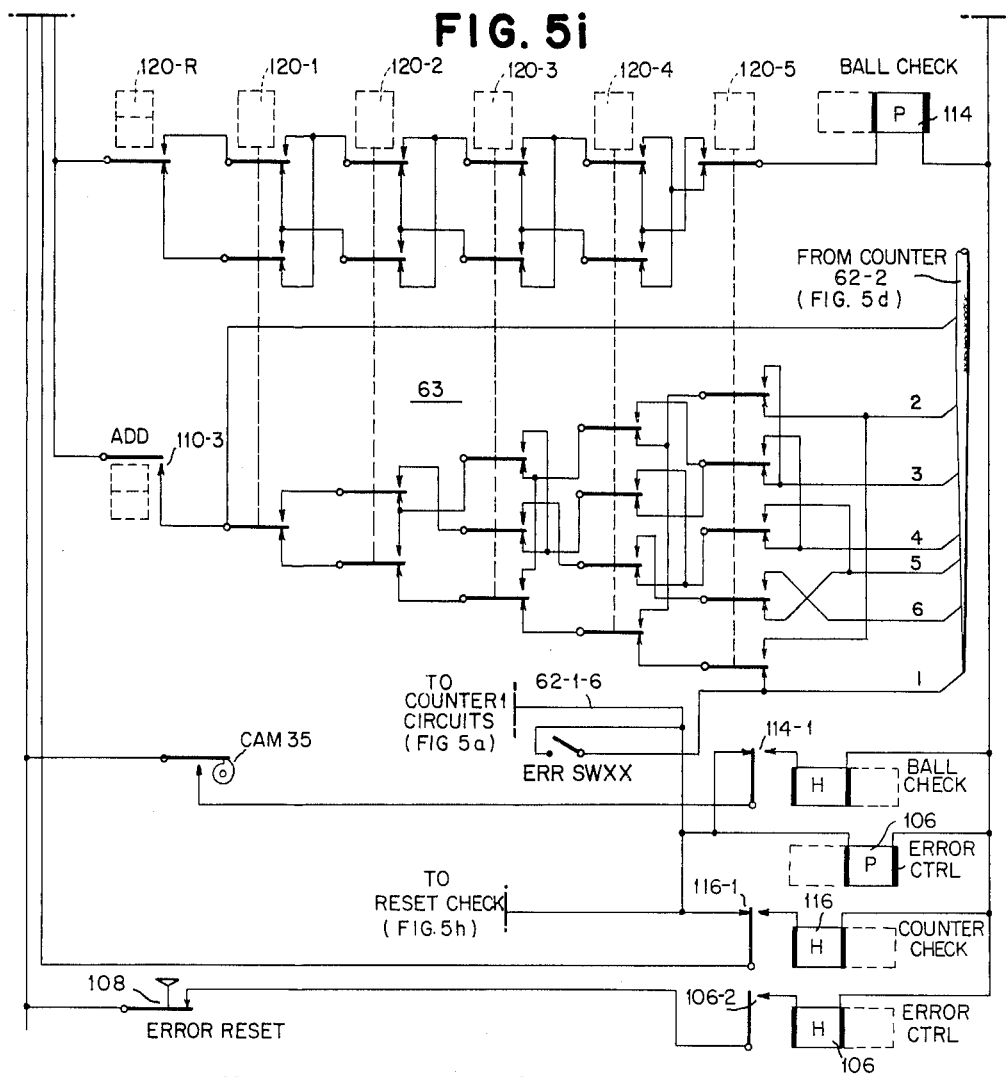

(A) *Ball check unit.*—At cam 34 time, a pulse is available through the Ball check circuit shown in FIG. 5i, to a Ball Check Relay 114, provided a predetermined pattern path has been established. Unless Ball Check Relay 114 is energized, during every punch cycle, then a pulse at cam 35 time will go through the normally closed point 114–1 to pick up the Error Control relay 106 and thereby lock the keyboard of the Typewriter Tape Punch, as heretofore described.

To show the operation of the Ball Check unit, reference is made to the sequence chart of FIG. 4 and particularly to the

"F"
S code which is the first code entered in the tape. It will be remembered that the

"F"
S code is represented by holes punched in the 1, 2, 4, 5 channels in the tape. In the use of the Ball Check unit, however, as described in the above-mentioned copending U.S. patent application Serial No. 556,643, an odd number of interposer magnets must be energized by the Tape Perforation Control 52. Accordingly, since

"F"
S is an even number code, the redundant interposer was also energized. If these magnets function properly, then the ball unit contacts 58–R, –1, –2, –4, –5, as shown in FIG. 5h, would have been closed whereby at cam 39 time the relays 120–R, 120–1, 120–2, 120–4 and 120–5 are energized and held through cam 34 time. Concurrently, with the closing of cam 34, a pulse is available through the check unit contact 120–R normally open, now closed; through 120–1 normally open, now closed; through 120–2 normally open, now closed; through 120–3 normally closed; through 120–4 normally open, now closed; through 120–5 normally open, now closed; to the Ball Check Relay 114. This relay is held through its own check point 114–1 and through cam 35 time.

As another example, when the

"P"
I code of the second cycle was entered in the tape, it energized the interposer magnet 88–R; –1, –2 and therefore, as previously described, if this information was correctly punched in the tape, then the relays 120–R, 120–1, and 120–2 would have been energized through the corresponding Ball contacts 58 at cam 39 time, and accordingly, a pulse at cam 34 time will pass through 120–R normally open, now closed; 120–1 normally open, now closed; 120–2 normally open, now closed; 120–3 normally closed; 120–4 normally closed; 120–5 normally closed to energize the Ball Check relay 114. This check is made at every punch cycle and as heretofore mentioned, unless the Ball Check relay 114 is energized, the keyboard of the machine 52 will be locked up.

(B) *Counter unit 62–2.*—The counter unit 62–2 and its actuating circuit are constructed to add numeric 1 to the number of like data bits on each punch cycle. Concurrently, with the odd check test for each punch cycle, a second set of Relay 120 contact points, which are used in a counter control circuit 63 for counter 62–2, as shown in FIG. 5i, are closed and a pulse is available to them via cam 34 when contact 110–3 is transferred. It will be recalled that the Add relay 110 was not energized until the second punch cycle, and therefore, a pulse was not available to the counter control circuit 63 during the

"F"
S code cycle. The

"P"
I code which was punched during the second cycle, energized the counter relays 120-R, 120-1, 120-2, but since the redundant code is not punched in the tape, the 120-R relay is not used in the counter control circuit 63. Therefore, during cam 34 time in the second punch cycle, with Add relay energized, the 110-3 contact point will be closed providing a pulse through 120-1 normally open, now closed; 120-2 normally open, now closed; 120-3 normally closed, 120-4 normally closed; 120-5 normally closed, into the add 3 line of the cable for counter unit 62-2 to count three pulses (two for the like data bits and one for the cycle). The cable for counter 62-2 is further shown in FIG. 5d as entering a box which represents a counter circuit that is identical to the counter circuit of FIG. 5b. Since the circuits are identical, they have not been shown, but it is to be understood that the relays corresponding to counter relays 1-10 in counter 62-1 are numbered 11-20 respectively in counter unit 62-2. All the lines from the counter relays to the counter 62-2 are connected to add 1 to the number of like data bits punched in each cycle. That is, if one hole is sensed the add 2 line is energized, if two holes are sensed the add 3 line is energized, etc. If no channels are punched the add 1 line is energized, with a manual switch SWX providing an additional circuit to error control relay 106, similar to the arrangement described in connection with FIG. 5a. A counter reset circuit is also provided through a contact of counter reset relay 104, and it performs the same function as the circuit through contact 104-2 in counter 62-1. The counter 62-2 reset is checked at cam 37 time through the reset check circuit shown in FIG. 5h. The counter relays 11 through 20 further have both (lower box FIG. 5d) a hold circuit which is identical to that shown in FIG. 5c, and Carry Relays which are identical to those shown in FIG. 5c.

It can be recognized that during each punch cycle electrical pulses in cable 54 are added in counter 62-1, while pulses emanating from Ball Check unit 58 are added in counter 62-2. The number of pulses added will be equal to the number of like data bits plus the number of machine cycles.

Figure 6:
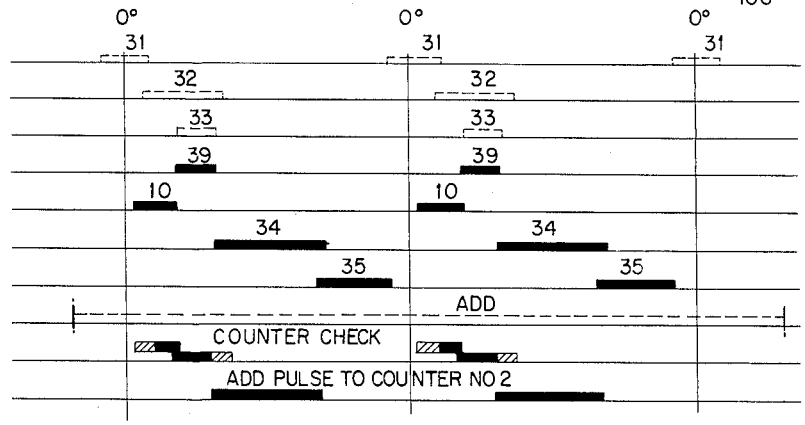
FIG. 6 is a timing chart.

Since this invention as well as aforesaid application Serial No. 553,001 assures correct tape by comparing the electrically generated pulses with the mechanically generated pulses during each punch cycle, the following circuitry is provided as shown in FIG. 5d:

A pulse is available through cam 10 and through a point of every Counter Relay 1-10; and 11-20 arranged in such a fashion that if the two counters agree a pulse is available to energize Counter Check Relay 116. Cam 10 closes at the beginning of every cycle, see timing chart FIG. 6, consequently it checks for correct operation of the previous punch cycle.

It will be recalled that at the start of this machine operation, the Counter Relays 10 and 20 were energized. Then during the first punch cycle, at cam 10 time, a circuit is available through the following normally closed points of the Counter Relays 1-11; 11-11; 2-11; 12-11; 3-11; 13-11; 4-11; 14-11; 5-11; 15-11; 6-11; 16-11; 7-11; 17-11; 8-11; 18-11; 9-11; 19-11; and then through 10-11, normally open, now closed and through 20-11 normally open now closed, to energize the pick coil of counter check relay 116. The Counter Check Relay 116 has a hold circuit shown in FIG. 5i, through its own contact point 116-1, and through cam 39. If at cam 39 time the counter check relay had not been energized, contact 116-1 point is normal and the pulse would be available to energize the Error Control Relay 106, to stop the machine.

Since the two counters are compared during every punch cycle, it can be seen that a double check is provided; namely, an odd count check, and a total count check. The latter will catch a double error in the odd count check, while the former determines whether a correct code has been generated by Tape Perforator control 52. A still further check may be provided to insure against a blank tape column by providing a circuit at add time through the Counter Control Relay contacts of each counter to Error Control Relay 106.

With reference to the middle portion of FIG. 4, wherein the message is punched in the tape through the operation of the character keys of a typewriter or the like. The depression of a key will close some multiplicity of selector unit contacts 118, FIG. 5f, described in detail in copending U.S. application Serial No. 556,629 along with the character key common contract 112, FIG. 5e. Both the character key common contact 122 and the selector unit contacts 118 feed pulses into the conductors of the cable 54 and thence to Tape Punch 56. At each punch cycle, the pulses are added in the counters, the counters are compared, and the code is checked for odd count. This cyclic process will continue through the message.

With reference to the third portion of the sequence chart, FIG. 4, the end of message signal or as illustrated, Carriage Return Key will initiate four automatic cycles and enter into the tape the

"C F L 3" R S F codes, FIG. 3, through following circuitry.

With reference to FIG. 5g, upon closing the Carriage Return key contact 72 with the contact 110-4 normally open, now closed, a pulse is available through Non-Repeat, normally closed contact 98-3 to energize the Carriage Return Relay 124. The Carriage Return Relay has a hold circuit, FIG. 5f, through rectifier 126 and through its own Carriage Return point 124-1, normally open now closed, through cam 31. A further hold circuit is provided through rectifier 128 through carriage return point 124-2 and through cam 32. The closing of the carriage return contact 124-3 will send a pulse to the punch clutch line and the number 4 interposer line of cable 54 through the rectifiers 130. With reference to FIG. 5a, the punch clutch 86 will be energized along with interposer 88-4 to punch in the tape the

"C"
R code, i.e., a single hole in channel 4. A numeric 2 representing the single data bit plus the cycle will concurrently be added into both counters and checked through the checking process already described.

At cam 32 time of the

"C"
R punch cycle, a pulse is available through contact 124-4 normally open, now closed to the Non-Repeat relay pick coil 98, FIG. 5f. This relay has a hold circuit, FIG. 5g, through its own contact 98-2 and 98-3 through the add contact 110-4 normally open, now closed, and through the carriage return key 72 as long as the operator has the carriage return key closed. The Non-Repeat relay will allow the dropping out of the Carriage Return relay 124 at the proper time of the cycle.

During the

"C"
R punch cycle, a pulse is available through cam 32 and through Carriage Return contact 124-5 normally open, now closed, shown in FIG. 5g, to energize the Fig. Shift relay 132. The Fig. Shift relay 132 has a hold circuit through its own point 132-1 and through a Line Feed contact 134-2. A second hold circuit is provided to the pick coil through its own contact 132-3 and cam 32. Fig. Shift relay 132 will hold up until cam 32 opens during

"F"
S cycle.

Near the end of the

"C"
R punch cycle, when cam 31 makes, a circuit is available through contact 132-4 normally open, now closed, through rectifiers 84 to the punch clutch and redundancy lines as well as lines 1, 2, 4, and 5 of cable 54, thereby conditioning the machine for a second automatic cycle wherein the

"F"
S code is punched in the tape. This code will be checked for redundancy and added together with numeric 1 for the cycles and the two adders are compared.

During the second automatic cycle, at cam 32 time, a pulse is available, FIG. 5g, through the normally closed point 124-5 and through the normally open, now closed point 132-2 to the pick coil of the Line Feed relay 134. This Line Feed relay has two hold circuits, one through its own point 134-4 and two contact 124-5 normally closed, and cam 32. The second hold circuit for Line Feed relay 134 is through its own contact 154-1 and Read Out relay point 136-2 normally closed. Line Feed relay 134 will hold up until cam 32 opens during

"L"
F cycle.

Near the end of the second automatic cycle, at cam 31 time, a pulse is available through Line Feed point 134-5 and through the rectifiers 140 to energize both the punch clutch and the number 2 interposer line of cable 54 which, as shown in FIG. 5a, will energize punch clutch 86 and interposer 88-2 to punch

"L"
F code in the tape. The

"L"
F code will be checked and the two bits added and counters will be compared.

During the third automatic cycle

"L"
F code, at cam 32 time, a pulse is available through the normally closed point 124-5, and the normally closed point 132-2 to the normally open, now closed point of the Line Feed relay 134-3 to the Read Out relay 136. This relay has two hold circuits, one through its own point 136-4 and through point 132-2 and 124-5 both normally closed to cam 32. The second hold circuit is provided through its own contact point and to the Program Set Up relay 76-4 normally closed. The Read Out relay 136 will hold up until cam 32 opens during the "3" punch cycle.

Towards the end of the Line Feed cycle at cam 31 time, a pulse is available through contact 136-5 normally open, now closed of the Read Out relay to the latch trip of the Add relay 110. When the latch trip drops out, both counters will have all the unit bits of the message.

Since it is an object of this invention to enter into the tape the unit order of the number of bits plus the number of columns or machine cycles in each message, circuitry is provided as follows for perforating the tape with the check code.

At cam 31 time toward the end of the

"L"
F cycle a pulse is available through the point 136-6 of the Read Out relay normally open, now closed through rectifier 142 to the punch clutch line of cable 43 which, with reference to FIG. 5a, will energize the punch clutch 86 sending the machine through a punch cycle. Concurrently, a pulse is available, FIG. 5e, through cam 36 and through Read Out relay point 136-7 normally open, now closed, through the Counter Relay 3-12 normally open, now closed, because the units order of the number of like data bits plus the number of columns or machine cycles in the message was 3, FIG. 3. The pulse passes through the rectifier 144 feeding the line 1 of cable 68, which then feeds into cable 54, and with reference to FIG. 5a, will energize Interposer 88-1. Since the punch clutch and the interposer have been energized, the machine will go through a cycle wherein channel 1 will be punched in the tape representing the check code digit 3. During this cycle, odd count check will take place, but adding will not occur since the 110 contact point has been opened. It will be recalled that both counters were compared at the beginning of the punch cycle, cam 10 time, to be sure that they were in agreement.

During the punch cycle wherein the check code is entered into the tape, a circuit is available, FIG. 5g, at cam 32 time through contact 124-5 normally closed, through 132-2 normally closed, through 134-3 normally closed, through 136-3 normally open, now closed through the rectifier 138 to energize the Program Set Up relay 76. This is held up through its own contact point as previously described, and through the Program Indication contact point 78-1.

With reference to FIG. 5h, it can be recognized that during the four automatic cycles

"C F L 3"
R S F

Keyboard Lock magnet 102 was energized to lock the keyboard.

It can be appreciated that at the end of the cycle wherein the check code was entered into the tape, the machine is ready to receive a start of message signal for the next message.

*Conversion unit*

After the tape has been prepared as above described, it is usually transmitted via well known communication systems such as lease wires or other media, and during this transmission, a second tape is prepared, known as a reperforated tape, which may then be used in conventional tape conversion equipment.

It is well known that errors can occur in a communications tape reader, or transmission line, or in the tape reperforator or in the tape converter but through the mechanism about to be described, provision is made for checking whether or not an error was made in the system, since the tape was produced.

Figure 7:
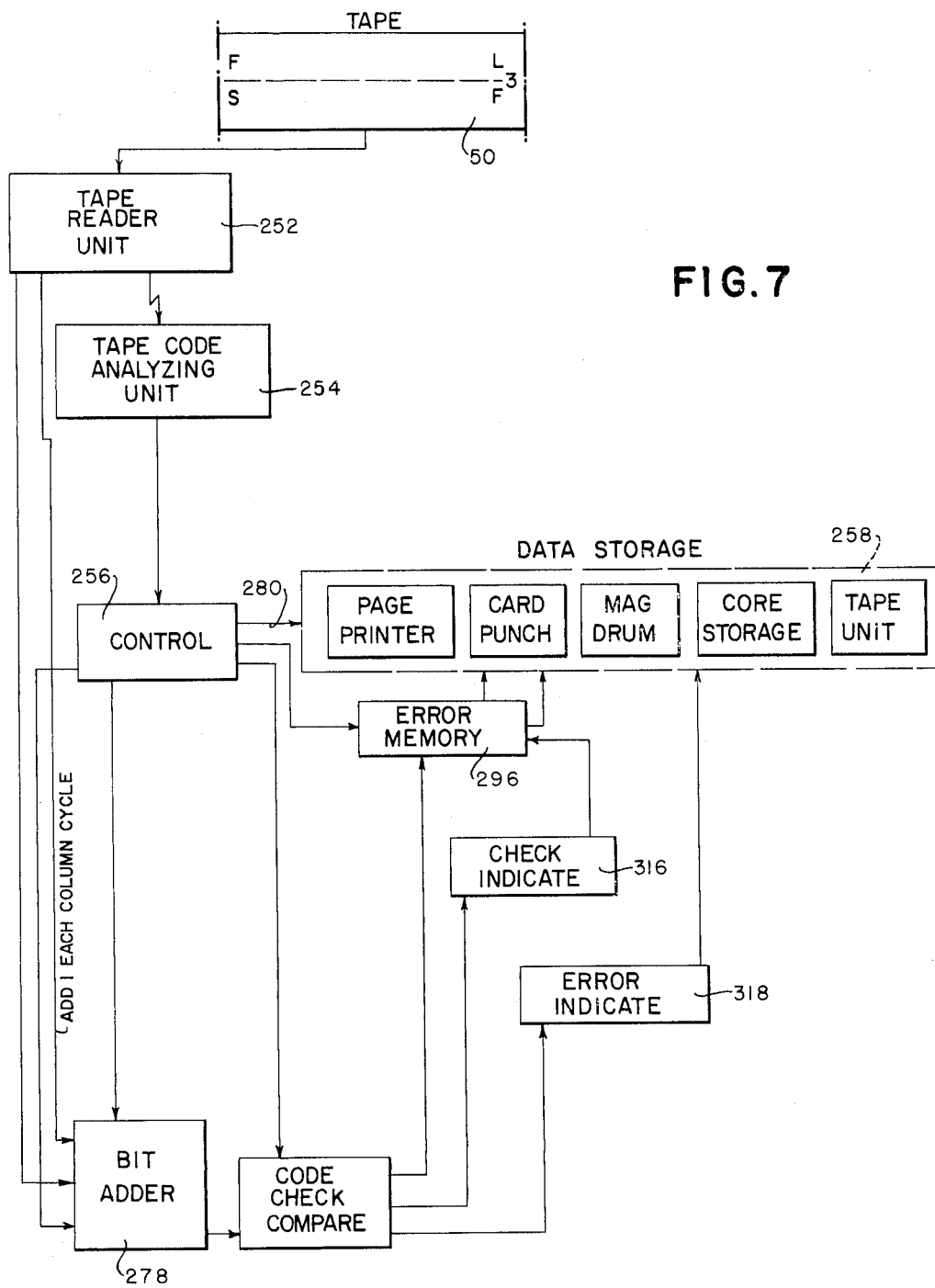
FIG. 7 is a diagrammatical representation of the tape conversion equipment employed in the tape processing system of this invention.

In order to illustrate the operation of this system, let it be assumed that a tape 250, FIG. 7, has been reperforated after transmission. The tape 250 is fed into a Tape Reader unit 252 wherein the tape code is analyzed in a Tape Code Analyzing Unit 254. The output of the Analyzing Unit 254 is fed into a Control Unit 256 which determines whether or not the information is fed directly into Data Storage 258, or is used to functionally control the conversion equipment.

It is to be understood that the Tape Reader unit 252 and the Tape Code Analyzing Unit 254 are described in detail in U.S. Patent 2,637,399 Doty. Then assuming a signal is available through Start Unit 262, FIG. 8a, to start reading the tape in continuous tape column read cycles, a pulse is provided as follows to reset a counter 278 used in the converter.

The pulse from the Start Unit 262 is available through Add point 266-1 normally closed, through Add point 268-1 normally closed, through Compare point 270-1 normally closed to energize Reset Control relay 264. This relay has a hold circuit through its own point 264-1 and through cam 231. At the beginning of the first tape read cycle at cam 232 time, a pulse is available through rectifier 276 through Add relay point 262-2 normally closed through Add point 268-3 normally closed, through Compare point 270-2 normally closed, through Reset Control 264-2 normally open, now closed, to energize Reset Relay 274. In phantom, relay 104 has been connected in parallel with the reset relay 274 merely to indicate that when reset relay 274 has been energized, the converter counter 278 is reset to zero in the same manner that counters 62 are reset by the energization of the relay 104, FIG. 5b. The counter 278 is identical with counter 62 with the exception of the fact that its counter relays are number 201 through 210.

Figure 8A:
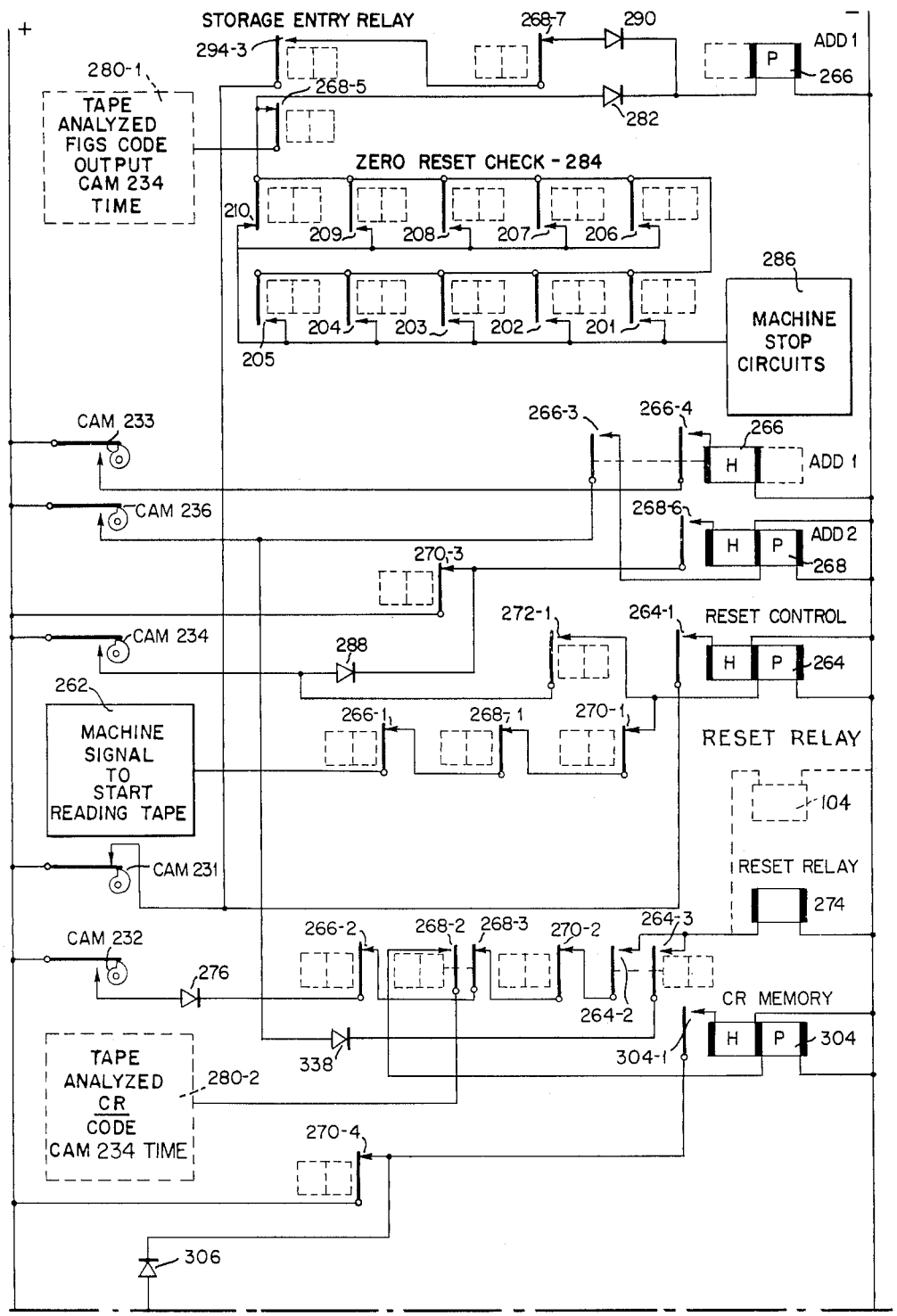
FIG. 8a through 8c is the wiring diagram of the conversion equipment.
Figure 8B:
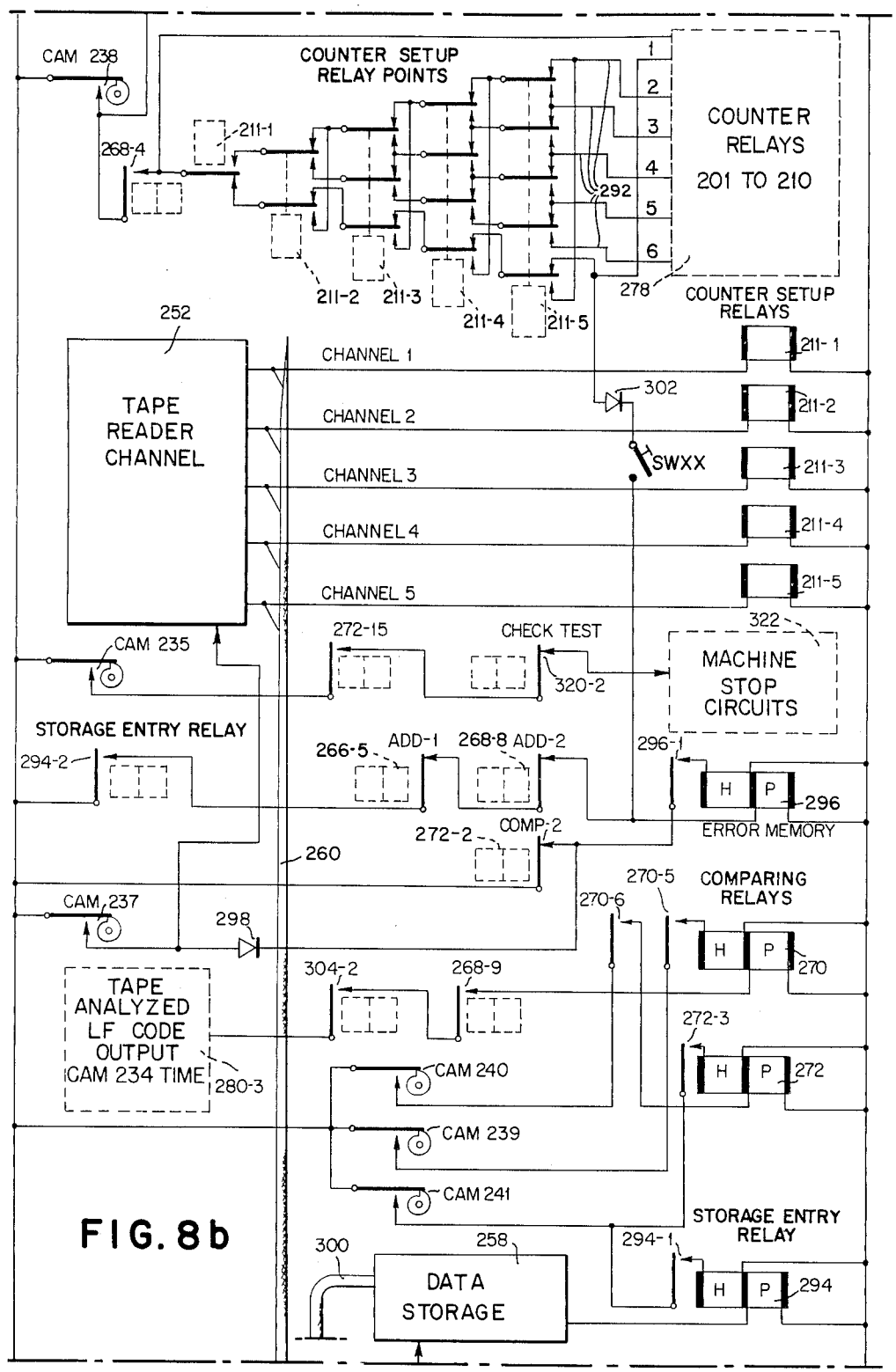

At cam 237 time, which takes place at the beginning of this first tape read cycle, a pulse is available through the Tape Reader 252, FIG. 8b, to energize counter set up relays 211–1 through 211–5. Simultaneously, pulses are available through cable 260 to the Tape Analyzing Unit 254, FIG. 8c, to pick up analyzing relays as shown in the Doty Patent 2,637,399.

Figure 8C:
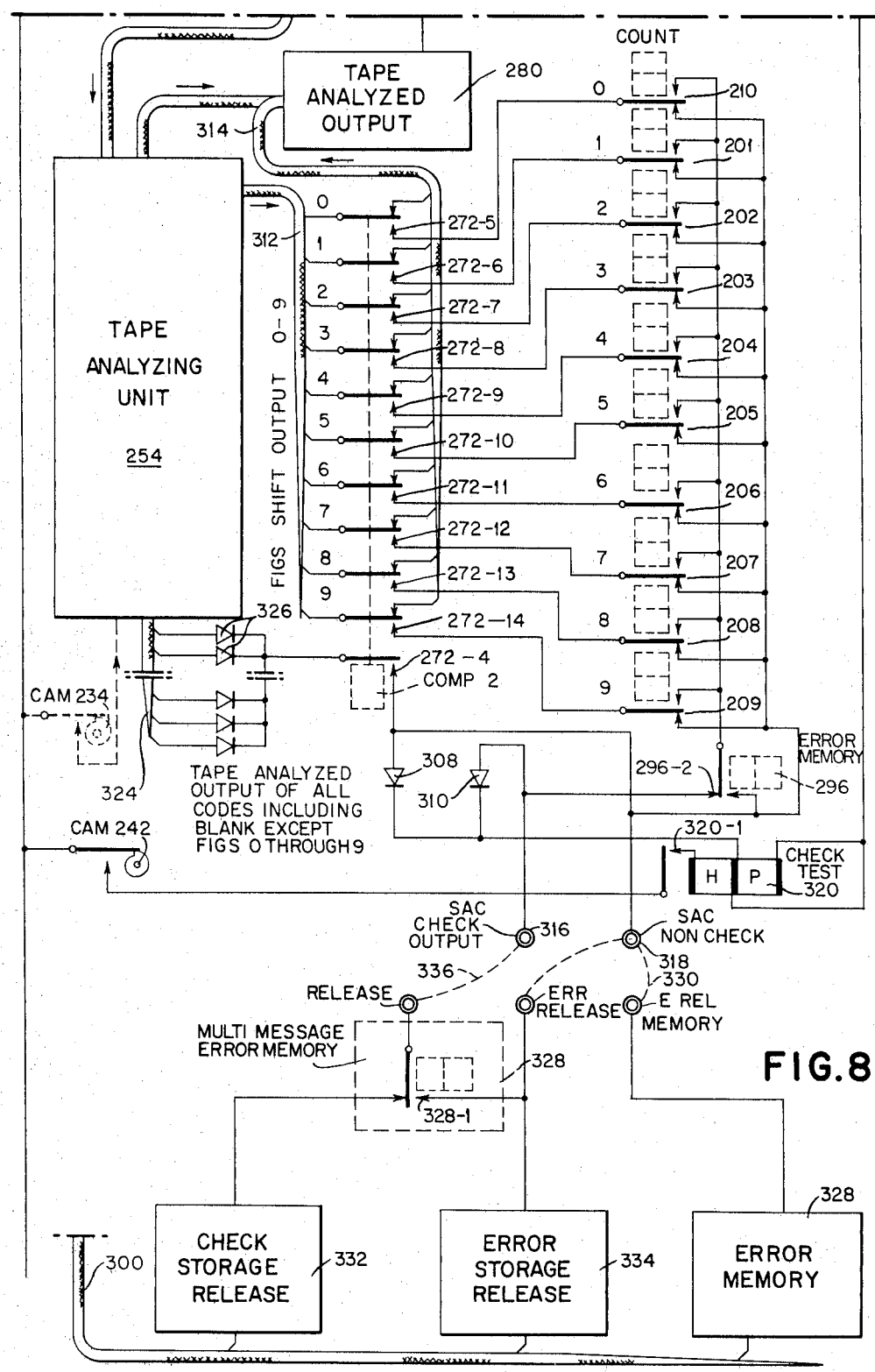

During the first tape reading cycle, after the analyzing relays have been energized in unit 254, a pulse is available at cam 234 time, through the Analyzing Relay contacts to generate a signal in Tape Analyzed Output Unit 280, FIG. 8c. Unit 280 is illustrated as having a sub unit 280–1, FIG. 8a, which is the output for

"F"
S code; a sub unit 280–2 is the output for a

"C"
R code; and a sub unit 280–3, FIG. 8b, which is the output for an

"L"
F code.

With respect to FIG. 8a, and sub unit 280–1 (in view of the fact that the first read cycle senses an

"F"
S code), a pulse is available through Add contact 268–5 normally closed, through rectifier 282 to energize the pick coil of the Add relay 266. This relay has a hold circuit through its own contact point 266–4 and through cam 233. During this first tape read cycle, a parallel pulse is available from sub unit 280–1 through the normally closed contact point 268–5 and through the Zero Reset Check circuit 284 to determine if the zero relay 210 had been energized, and all the other counter relays 201 through 209 have been de-energized. Unless this condition exists, a pulse will be available to the machine stop unit 286, which through conventional means, will interrupt the operation of the tape converter.

During the first tape read cycle at cam 236 time, a pulse is available, FIG. 8a, through the Add contact 266–3 normally open, now closed, to energize the pick coil of the Add Relay 268. This relay has a hold circuit through its own point 268–6 through the Compare point 270–3. A parallel hold circuit is provided for the Add relay 268 through rectifier 288 at cam 234 time. It can be appreciated that the Add relay 268 will be energized and will remain energized until both the Compare point 270–3 and cam 234 are open at the same time.

During the second tape read cycle,

"P"
I code, a pulse is available at cam 237 time, FIG. 8b, through the tape reader 252 to energize the counter set up relays 211–1 and 211–2 (since the

"P"
I code is a hole in channels 1 and 2 of the tape). Concurrently, a pulse is available through cable 260 into the Tape Analyzing Unit 254 to pick up analyzing relays, and in every tape read cycle this same sequence takes place.

During the second read cycle at cam 238 time, a pulse is available, FIG. 8b, through are Add contact point 268–4 normally open, now closed, through 211–1 normally open, now closed, through 211–2 normally open, now closed, through 211–3 normal, through 211–4 normal, through 211–5 normal, sending a pulse into the add 3 line of the cable 292 going to the Counter Unit 278. Numerical 3 being added is the result of adding the number of like data bits (2) to the numeric 1 representing the machine cycle or column. Since the counter unit 278 is identical to the one shown in FIG. 5b and 5c, a pulse through the add 3 line of cable 292 will perform the same function as a pulse through the add 3 line going into the counter 62–1. The lines from the relay tree network defined by Counter Set Up relay points are connected such that the reading of 2 like data bits in the tape will energize the add 3 line to the counter relays 201–210 under control of the machine cycle. Similarly, reading of 3 like data bits in the tape will enegrize the add 4 line, etc. Reading of 5 like data bits in the tape will energize the add 6 line. The numeric 1 added to the number of like data bits represents the column cycle as explained above in connection with FIG. 3.

*Data storage*

During each tape reading cycle, while the analyzing relays in the Tape Analyzing Unit 254 are energized, a pulse through cam 234, in passing through the analyzing network and into the Tape Analyzed Output unit 280, is also available to the Data Storage Unit 258. This Data Storage Unit 258 can be a page printer, a tape unit, a card punch, magnetic drum, core storage, etc., and accordingly, information will be entered in tape read cycles into some storage medium.

Concurrently, with the entering of information into Data Storage Unit 258, a pulse is available on each input to data storage cycle which energizes a Storage Entry relay 294, FIG. 8b. This relay has a hold circuit through its own contact point 294–1 and through cam 241.

Then at cam 231 time, towards the end of a read cycle, a pulse is available through 294–3 normally open, now closed, through the Add relay point 268–7 normally closed, through rectifier 290 energizing the pick coil of the Add relay 266. It will be recalled, however, that a pulse during

"F"
S code read cycle was supposed to pick up the Add relay 266. The purpose of the second pulse through the pick coil of relay 266 via the storage Entry Relay is to insure the fact that the relay 266 has been energized. Since if the

"F"
S code had been multilated, the pulse would not be available to the Add relay 266 during

"F"
S code cycle. The purpose for this duplicate circuit to the Add relay 266 is merely to keep control circuitry available for functions which will be later described. The primary function of the energization of Storage Entry relay 294 is to make certain that the Adding Circuit is functioning. That is, when relay 294 is energized, a circuit is available, FIG. 8b, through point 294–2 normally open, now closed, and through the Add relay point 266–5 normally closed, through the Add point 268–8 normally closed (providing the Add relays 266, 268 have not been energized) and then to the pick coil of the Error Memory 296. The Error Memory Relay has a hold circuit through its own point 296–1 and through rectifier 298 and cam 237. A parallel hold circuit is available through Compare point 272–2 normally closed. The consequence of energizing the Error Memory relay 296 will be later described.

During every tape read cycle, depending upon the information read in the tape, pulses are selectively available at both the Tape Analyzing Unit 254 and the Counter Set Up relays 211–1 through 211–5. Then a pulse is available at cam 238 time through the points of the Counter Set Up relays to feed a pulse (indicating number of like data bits in the tape code plus numeric 1 representing the column cycle) into the counter 278. However, if during any tape read cycle, none of the Counter Set Up relays 211–1 through 211–5 are energized, then at cam 238 time, a circuit is availble through the Add relay point 268–4 through the normally closed points of the Counter Set Up relays to the add 1 line or through the rectifier 302 and manual switch SWXX to energize the Error Memory relay 296. If manual switch SWXX is closed, a blank column cycle will energize the Error Memory Relay 296. However, it is frequently desirable to transmit blank columns, and if this is the case, switch SWXX can be opened and the failure to energize Counter Set Up relays 211–1 through 211–5 will cause numeric 1, representing the column cycle, to be added to the counter.

*End of message signal*

Figure 9A:
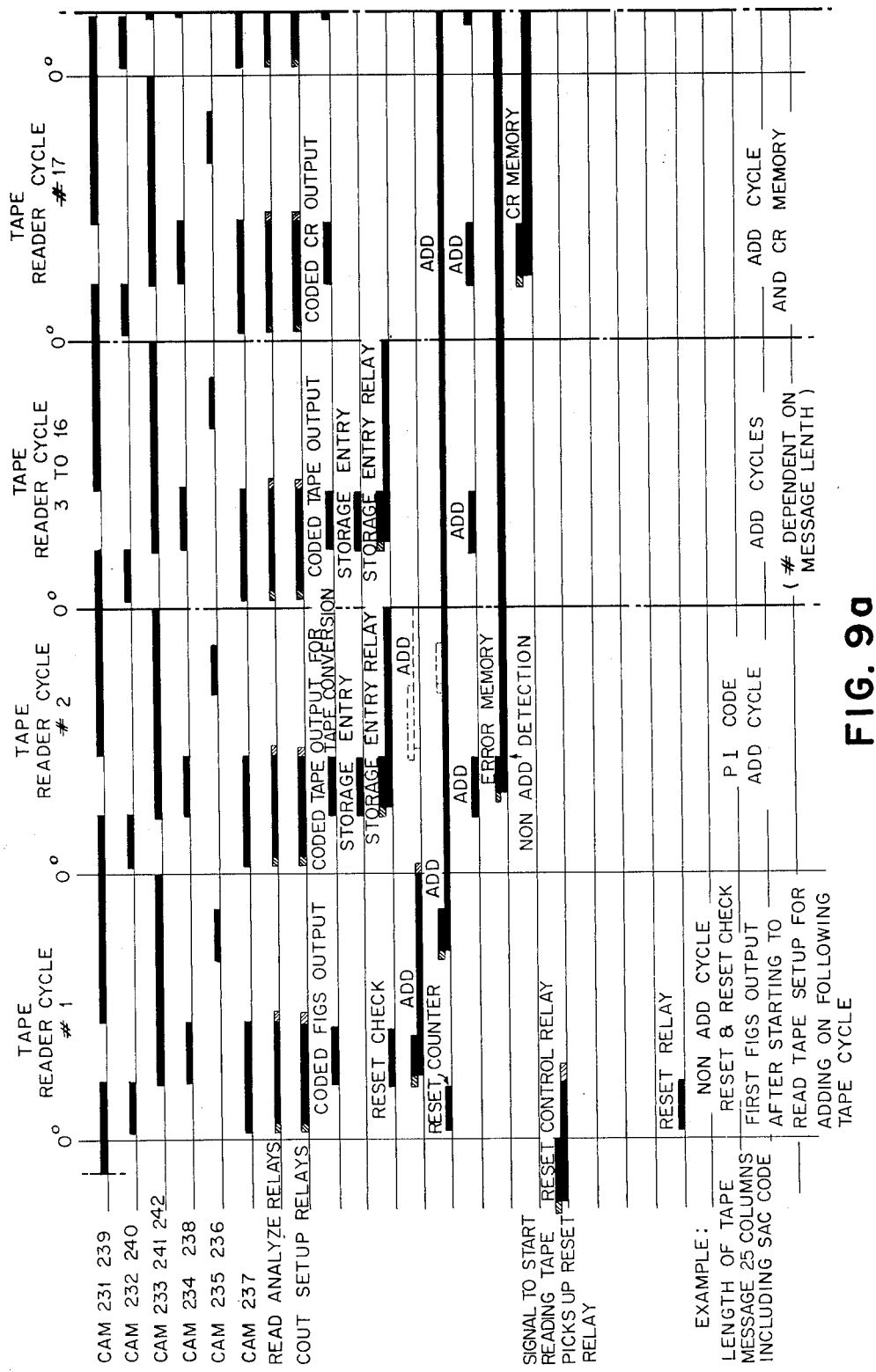
FIG. 9a and 9b is a timing of sequence chart of the operation of the conversion equipment.
Figure 9B:
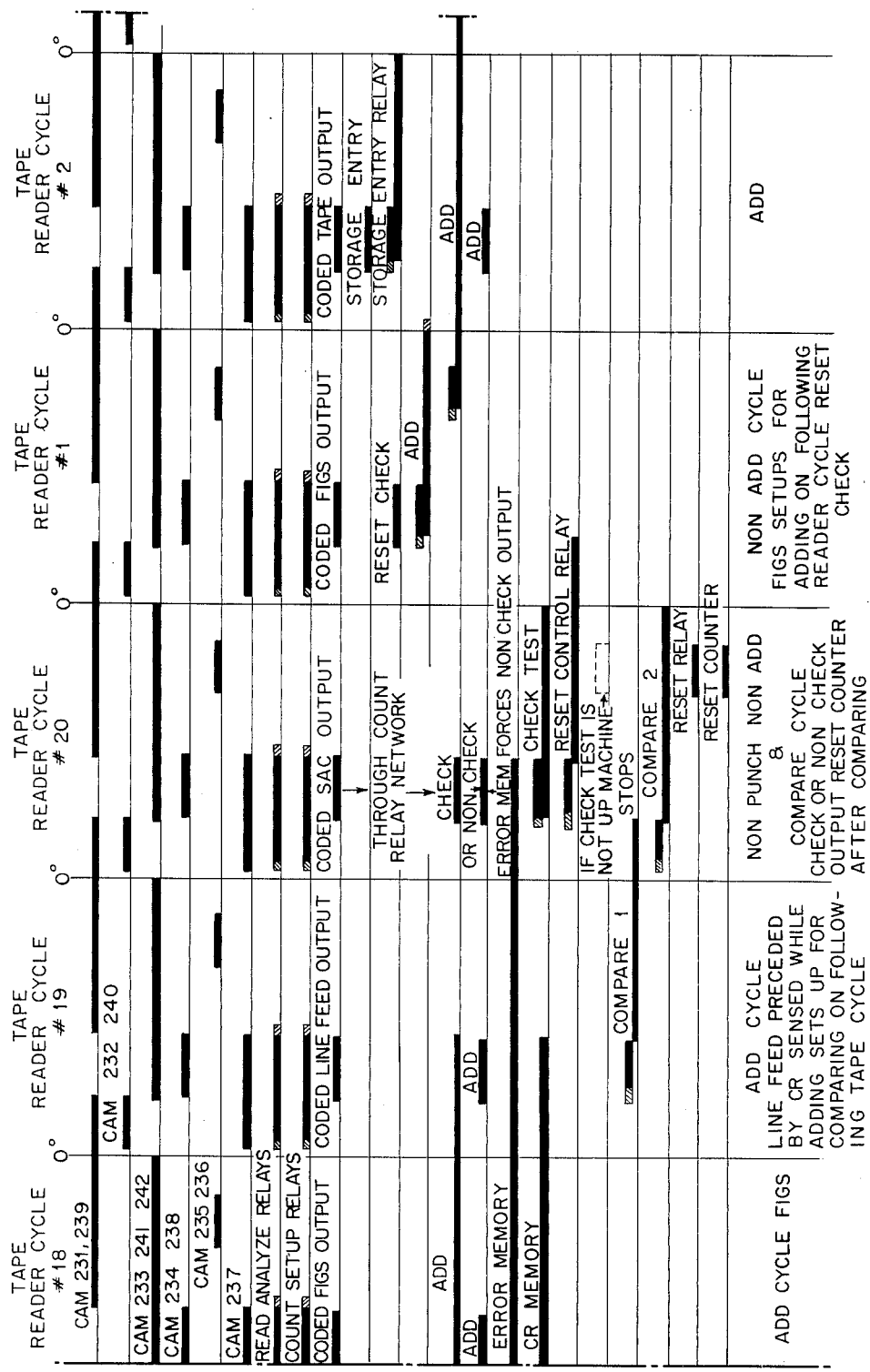

With reference to FIG. 9, the sequence chart and the above description illustrates the operation through the first sixteen cycles of the tape message. It will be recalled, that the tape message prepared above was concluded with the following code:

"C F L3"
R S F

With this background information, reference is now made to tape reader cycle 17 wherein

"C"
R signal is read in the tape.

With reference to FIG. 8a, and more specifically to the Carriage Return output from sub unit 280–2, a circuit is available on the tape reader cycle 17 through the Add point 268–2 normally open, now closed, to energize the Carriage Return Memory pick coil 304. This relay has a hold circuit through its own contact point 304–1, through the rectifier 306, and cam 238, and a parallel hold circuit through the normally closed point of the Compare relay 270–4. It follows that relay 304 will be held up until both the Compare point 270–4 and cam 238 are opened at the same time. The tape read cycle 18 has a

"F"
S code in accordance with the Doty patent 2,637,399, merely serves the function of shifting the control circuitry in the Tape Analyzing Unit 254 in order to accommodate numeric codes.

In read cycle 19, wherein the

"L"
F code is read in the tape, the tape analyzed output for a

"L"
F code, from sub unit 280–3, FIG. 8b, is available through contact 304–2 normally open, now closed, through Add point 268–9 normally open, now closed to the pick coil of the compare relay 270. This relay has a hold circuit through its own point 270–5 and cam 239.

During the nineteeth cycle, right after the number of bits in the

"L"
F code plus 1 for the read cycle has been entered into the counter, it will be noted that a pulse is no longer available through the Compare 270–3 contact point to energize the hold coil of Add relay 268, FIG. 8a. Accordingly, when cam 234 opens, the parallel hold circuit through rectifier 288 will be opened and the Add relay 268 will drop out.

During the twentieth tape cycle, which contains the check code for the message, a circuit is available at the beginning of that cycle through cam 240, FIG. 8b, and through the normally open, now closed point of Compare relay 270–6, to energize the pick coil of a Compare relay 272. This relay has a hold circuit through its own point 272–3 and through cam 241.

It will be recalled that the purpose of this invention is to determine whether or not a tape was correctly transmitted; correctly reperforated; and/or correctly read by the tape conversion equipment. If no error had occurred, then the number in the counter 278 at the beginning of the twentieth cycle will be equal to the value of the check code, and the correct transmission will be indicated. If the counter 278 does not agree with the check code, then an error has been made somewhere in the system, and this error must be indicated.

To accomplish these objectives, circuitry is provided (Doty Patent 2,637,399) whereby when a numeric digit code 0–9 is read in the tape, a representative pulse is sent to cable 312 via cam 234, and via Tape Analyzing Unit 254. Under the normal condition of the Compare relay contact points 272, the pulses from cable 312 will be funneled into cable 314, and then into the Tape Analyzed Output Unit 280 via which is would be entered into Data Storage 258. If Compare relay 272 were energized, however, a numeric pulse in cable 312 will pass through a corresponding one of the transferred contact points 272, through the corresponding point of a Counter Relay 201 through 210, and then to either hub 316, or 318, depending upon the condition of the counter relays.

In the illustrated embodiment, the twentieth cycle contains the check digit 3 and therefore, during cam 234 time, a pulse is available through the Tape Analyzing Unit 254 and into cable 312 and then through the line 3 into Compare contact 272–8 normally open, now closed (Compare Relay 272 was energized in an earlier part of the instant cycle) to a point of the Counter Relay 203. If Counter Relay 203 is energized, as it will be for a correct transmission, then a pulse is available through the normally open, now closed point of Counter Relay 203; through the normally closed point of the Error Memory Relay 296–2 to the hub 316. A parallel circuit is available through rectifier 310 energizing the pick coil of check test relay 320. On the other hand, if the point of the relay 203 was in its normal condition, the pulse would go directly to hub 318. It will be noted, however, that the pulse through the normally open side of Counter Relay contact 203 will pass through the contact 296–2. However, if during the message the Error Memory Relay 296 has been picked up, then the pulse will be transferred to hub 318. When hub 318 is energized by either of the above circuits, a parallel circuit through rectifier 308 energizes the pick coil of Check Test Relay 320.

If during the check code read cycle a code other than 0 through 9 is analyzed by the Tape Analyzing Unit 254, a pulse will be supplied to cable 324 (since in every Tape Read Cycle Analyzed codes other than 0 through 9 are available to cable 324 as described in Doty Patent 2,637,-399). This pulse will pass through rectifiers 326; through compare relay point 272–4, now closed to hub 318; a parallel circuit is available through rectifier 308 to energize the pick coil of check test relay 320. This relay has a hold circuit through its own point 320–1 and through cam 242.

Therefore, during the twentieth tape read cycle (in the illustrated embodiment), a pulse should be available to either the 316 or 318 hub. However, a check is made to determine if there is a break in this network that would prevent either hub 316 or 318 being pulsed. That is, later during the twentieth cycle, at cam 235 time, a pulse is available, FIG. 8b, through the Compare point 272–15 normally open, now closed, since the Compare cycle is in process, and then unless the check test point 320–2 is open, to machine stop circuits 322 which will stop the machine through some conventional means.

With the circuitry described, it can be recognized that at the end of every message a pulse is available at either hub 316 or hub 318 provided the Check Test Relay 320 had been energized. The pulse to the hub 316 (indicating all checks have been satisfied) may be wired to elements of the Data Storage System 258 to indicate that a correct message was converted. A pulse to hub 318 can be wired to indicate that an error message was converted. For a specific instance, the pulse through hub 318 could be used with a page printer to energize a solenoid or other means to mark a line as being in error.

If card punch Data Storage were used, where multiple messages are stored in one card, the hubs 316, 318 can be utilized as follows: Suppose at the end of the first message the hub 318 were energized. Then a pulse would be available through the plug wire 330 to an Error Memory 328. The Error Memory circuit includes a relay having a contact 328-1 with a normally closed point wired to a Check Storage release system 332, and a normally open point wired to an Error Storage release system 334. Under these circumstances, for multi-message storage, if an error occurs in any message then the contact point 328-1 would be transferred, then any future pulse from hub 316 via plug wire 336 would pass through contact point 328-1 normally open, now closed, to the Error Storage release 334. Admittedly, details of this circuitry are not described (nor claimed) but it does illustrate schematically one method of handling multiple message storage.

Counter reset

The counter 278 must be reset at the end of every message. This is accomplished in the following manner: Towards the end of the check code cycle, a pulse is available through cam 234 and via Compare contact point 272-1 normally open, now closed, in FIG. 8a, to energize the Reset Control Relay 264. This relay has a hold circuit via its own contact point 264-1 and through cam 231. At cam 236 time of the same cycle, a pulse is available through rectifier 338, FIG. 8a, and through the reset control point 264-3 normally open, now closed to the Reset Relay 274 which as mentioned before, is shown in parallel with the phantom reset relay 104 which resets the counter to zero, as above described with reference to FIGS. 5b and 5c.

In this manner, the message has been completed and the Tape Converter is reconditioned to read a

"F"
S code indicating the beginning of the next message. (See FIG. 9b tape read cycle 1 following tape read cycle number 20.)

Carriage return memory

As above described, a carriage return memory relay 304 is provided in FIG. 8a of the wiring diagram. The purpose of this relay 304 is to provide for the possibility of inserting plural

"L"
F signals without erroneously conditioning the machine to receive a check code. Plural

"L"
F signals are used to line space a page printer. In order to accomplish this objective, provision is made whereby the system must read a

"C"
R code before a

"L"
F code in order to condition the machine for a check code. This result is accomplished through the use of a Carriage Return Memory Relay 304 which has a contact point 304-2, FIG. 8b, in the output from the

"L"
F sub unit 280-3, whereupon a pulse which does not find 304-2 contact points closed, will not energize the compare relay 270, which relay must be energized in order to condition the machine to receive a check code.

Automatic error deletion for systems accuracy check

It can be appreciated that only good tape should be transmitted on any communication system because of the hard copies that would be prepared and therefore, it is desirable to obliterate all the error information in a message. This could be done manually by backing up the tape to the proper column and then perforating the tape with

"L"
S codes, but if this were done, the counters would not be reset, whereupon the check code then would not agree with the message prepared. To avoid this, notches 148 and 150 (FIG. 2) are made in tape 50 to indicate the start of two successive messages. Then through the utilization the equipment described in detail in copending U.S. application Serial No. 555,531, the entire message in error can be obliterated and automatically replaced with

"L"
S signals. The conditioning means for the automatic error deletion operation automatically resets the counters to zero.

Summary

Summarizing, applicant has disclosed a checkable tape record length control device which will detect errors in the preparation, transmission and reperforation of tape records. Through the expedient of adding numeric 1 to the counting units under control of the timing cams in the tape punch mechanism and the tape reader unit, the apparatus can detect errors due to mis-feeding, adding or dropping tape columns in transmission, and the like. By the use of the system disclosed herein the accuracy of a data transmission system has been tremendously improved while the cost of improving the accuracy to this great extent has or is quite low.

While there have been shown and described and pointed out the fundamental novel features of the invention as applied to a preferred embodiment, it will be understood that various omissions and substitutions and changes in the form and details of the device illustrated and in its operation may be made by those skilled in the art without departing from the spirit of the invention. It is the intention, therefore, to be limited only as indicated by the scope of the following claims.

What is claimed is:

1. In an apparatus for checking the accuracy of coded record data in a record transmission system, the system including means for controlling the generation of coded record data in data column cycles, means for indicating the end of a record data message, and means for entering a coded check digit at the end of the message, the improvement that comprises, means for additively counting the number of like data bits and the number of column cycles in the message, means for entering the units order of the total number of like data bits plus column cycles as the check digit in the record, and means for comparing the check digit entered with the check digit of the correct message to thereby detect an error if the check digits do not compare.

2. An apparatus for checking the accuracy of coded record data preparation, transmission and receiving, the apparatus comprising, means for generating data in record tape in a plurality of column cycles, each of said column cycles containing a predetermined individual number of like data bits as a code, means for indicating the end of a message and entering a check digit in code in the tape, a counter for adding the number of like data bits in each column and the number of cycles the machine goes through, and means for entering the units order of the counter into the check digit position.

3. A mechanism for detecting errors in messages in the preparation, transmission, and reperforation of paper tape, the mechanism comprising; a counter for adding the number of like code bits in a message and the number of cycles of the mechanism during preparation, means responsive to the completion of a message for entering into said tape a coded check digit indicating the units order of the number of like code bits and column cycles in a message, means for reading said paper tape in tape column cycles, means responsive to the operation of the tape reader for counting the column cycles plus the number of like code bits in the message and means for comparing the units order of the reader controlled counter with the check digit entered into the tape.

4. A mechanism for checking for errors in messages in a paper tape data transmission system comprising; means controlling a tape punch in tape column bit code punch cycles, code means indicating the beginning and end of a message in said tape, means counting the number of like code bits and the number of punch cycles in a message, means for entering into said tape in a column following an end of message code a check digit code corresponding to the units order of the number of like bits and punch cycles in said message, means for reading said tape in column cycles, means responsive to the operation of said tape reader for counting the column like code bits and the columns in said message, and comparing means for determining in each message the agreement or non-agreement between the units order of said reader controlled counter and said check digit code at the end of said message.

5. A mechanism for checking the accuracy of preparation of paper tape comprising; means controlling a tape punch in tape column bit code punch cycles, means indicating the beginning and end of a message in said tape, a first counter cyclically responsive to electrical pulses generated by said punch control means and indicating the number of like data bits and the number of punch cycles, a second counter responsive to electrical pulses generated by actual operation of said tape punch to count the number of like data bits punched in a message and the number of tape columns, circuitry for comparing said counters column by column and means for reading out the counter total at the end of message and punching its value as a check digit into said tape in the column following the end of message code, means transmitting said tape message over a communication system and reperforating a tape with said message, means reading the transmitted message in the reperforated tape column by column, means accumulating the units order of the number of like data bits and column cycles, and comparing means for comparing the number in the accumulator means with said check digit.

6. A mechanism for checking the accuracy of preparation or transmission of record data in messages comprising; record data generating means, means for controlling said record data generating means in record column cycles, code generating means for indicating the beginning and end of a message in said record, counting means for accumulating the like code bits and the number of column cycles in each message, and means automatically responsive to the end of a message for reading out said counter total to control the operation of said code generating means to record a like code in said record indicating the units order of the number of code bits and column cycles in said message.

7. A mechanism for checking the accuracy of preparation and transmission of messages in paper tape comprising; counter means for adding the number of like code bits and the number of column cycles in a message during preparation, means responsive to the completion of a message for entering into said tape a check code indicating the units order of the number of like code bits and column cycles in a message, means for reading said paper tape in tape column cycles, means responsive to the operation of the tape reader for counting the number of like code bits and the number of column cycles in a message and means for comparing the units order of said reader controlled counter against said tape digit check code.

8. A converter for punch paper tape comprising; means for reading a paper tape having a check code at the end of a message therein, said reader operating in tape column cycles, means responsive to the operation of said tape reader for counting the number of like data bits in said message and the number of columns in said message and accumulating the units order thereof, and means responsive to the end of message tape column code for comparing said reader controlled counter with said tape check code.

References Cited by the Examiner

UNITED STATES PATENTS

| | | | |
|---|---|---|---|
| 2,653,996 | 9/1953 | Wright | 178—23 |
| 2,674,727 | 4/1954 | Spielberg | 340—172.5 |
| 2,918,526 | 12/1959 | Wright | 340—174 |
| 2,993,956 | 7/1961 | Steeneck | 178—23 |
| 3,017,610 | 1/1962 | Auerbach et al. | 340—172.5 |

OTHER REFERENCES

Pages 187–190, Copyright 1955—Publication: Arithmetic Operations in Digital Computers by R. K. Richards, D. Van Nostrand Co., Inc.

MALCOLM A. MORRISON, *Primary Examiner.*

IRVING L. SRAGOW, *Examiner.*